(12) United States Patent
Chae

(10) Patent No.: US 11,436,316 B2
(45) Date of Patent: Sep. 6, 2022

(54) AUTHENTICATION SYSTEM, AUTHENTICATION DEVICE, AUTHENTICATION METHOD, AND PROGRAM

(71) Applicant: RAKUTEN GROUP, INC., Tokyo (JP)

(72) Inventor: Yeongnam Chae, Tokyo (JP)

(73) Assignee: RAKUTEN GROUP, INC., Tokyo (JP)

(*) Notice: Subject to any disclaimer, the term of this patent is extended or adjusted under 35 U.S.C. 154(b) by 304 days.

(21) Appl. No.: 16/652,067

(22) PCT Filed: Dec. 26, 2018

(86) PCT No.: PCT/JP2018/047906
§ 371 (c)(1),
(2) Date: Mar. 29, 2020

(87) PCT Pub. No.: WO2020/136763
PCT Pub. Date: Jul. 2, 2020

(65) Prior Publication Data
US 2020/0250297 A1 Aug. 6, 2020

(51) Int. Cl.
*G06F 21/00* (2013.01)
*G06F 21/45* (2013.01)
(Continued)

(52) U.S. Cl.
CPC .............. *G06F 21/45* (2013.01); *G06F 21/32* (2013.01); *H04L 63/083* (2013.01);
(Continued)

(58) Field of Classification Search
CPC .. G06F 21/45; G06F 21/32; G06F 2221/2117; H04L 63/083; H04L 63/0861; H04L 2463/082
See application file for complete search history.

(56) References Cited

U.S. PATENT DOCUMENTS

2013/0159021 A1* 6/2013 Felsher .................. G16H 10/60
705/3
2013/0159154 A1* 6/2013 Purves ................. G06Q 20/363
705/35
(Continued)

FOREIGN PATENT DOCUMENTS

CN 105409186 A 3/2016
CN 107644154 A 1/2018
(Continued)

OTHER PUBLICATIONS

Search Report dated Sep. 28, 2020, for corresponding EP Patent Application No. 18941096.2.
(Continued)

*Primary Examiner* — Kendall Dolly
(74) *Attorney, Agent, or Firm* — HEA Law PLLC

(57) ABSTRACT

Registration means of an authentication system (S) registers, for each user, first authentication information and second authentication information in storage means. First authentication means performs first authentication based on a similarity between the first authentication information that has been input and the registered first authentication information. Second authentication means performs second authentication based on a match between the second authentication information that has been input and the registered second authentication information. Restriction means restricts a plurality of users having similar first authentication information to each other from registering the same second authentication information as each other.

10 Claims, 11 Drawing Sheets

(51) Int. Cl.
*G06F 21/32* (2013.01)
*H04L 9/40* (2022.01)
(52) U.S. Cl.
CPC .. *H04L 63/0861* (2013.01); *G06F 2221/2117* (2013.01); *H04L 2463/082* (2013.01)

(56) References Cited

U.S. PATENT DOCUMENTS

| | | |
|---|---|---|
| 2015/0052350 A1 | 2/2015 | Aumasson |
| 2015/0220914 A1* | 8/2015 | Purves ............... G06Q 30/0633 705/41 |
| 2018/0026954 A1 | 1/2018 | Toepke et al. |

FOREIGN PATENT DOCUMENTS

| | | |  |
|---|---|---|---|
| EP | 1873675 A2 | 1/2008 | |
| JP | H08137800 A | 5/1996 | |
| JP | 2004153440 A | 5/2004 | |
| JP | 2008071366 A | 3/2008 | |
| JP | 2014230642 A | 12/2014 | |
| JP | 2017215894 A | 12/2017 | |
| WO | WO-0182036 A2 * | 11/2001 | ......... G06F 21/6209 |

OTHER PUBLICATIONS

Office Action dated Feb. 25, 2020, for corresponding JP Application No. 2019-563298 and partial translation of the Office Action.

* cited by examiner

FIG.5
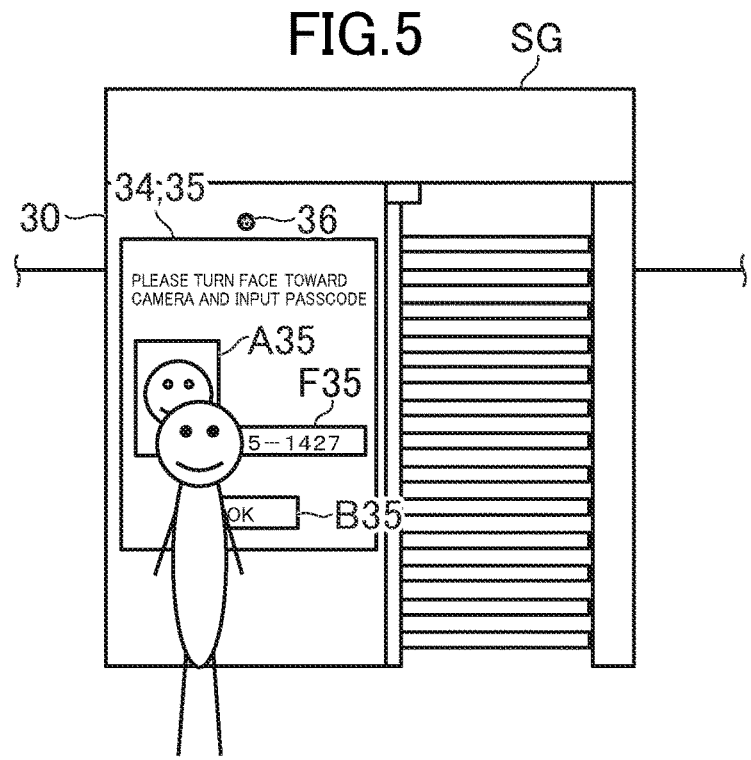
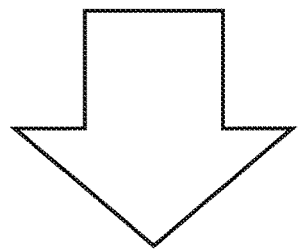
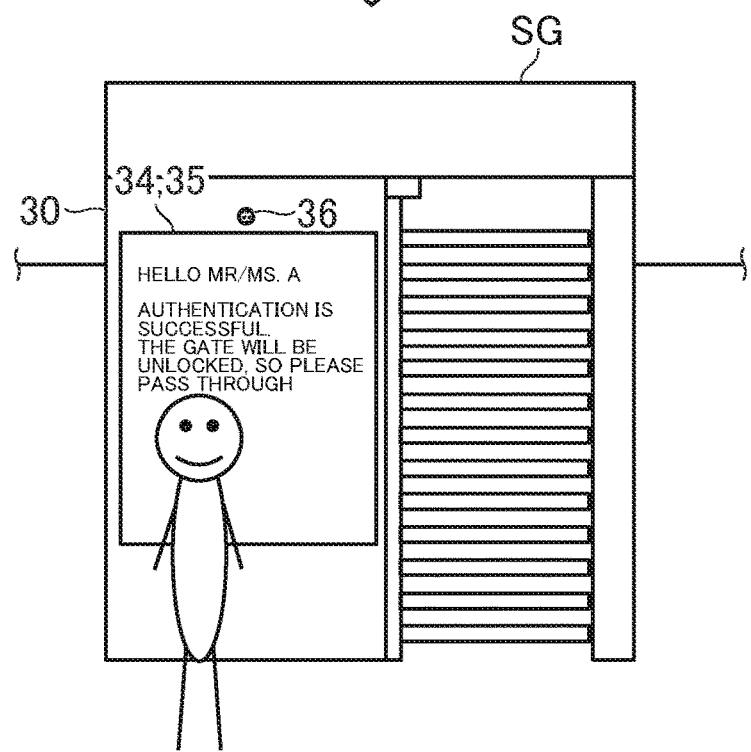

FIG.7

| USER ID | NAME | PASSWORD | FACE PHOTOGRAPH | FEATURE AMOUNT OF FACE | PASSCODE |
|---------|------|----------|-----------------|------------------------|----------|
| u00001 | A | ******** | aaa.jpg | (a1,a2,a3,·····) | 5-1427 |
| u00002 | X | ******* | xxx.jpg | (x1,x2,x3,·····) | 2-5523 |
| u00003 | Y | ********* | yyy.jpg | (y1,y2,y3,·····) | 0-9128 |
| ·· | ·· | ·· | ·· | ·· | ·· |

DB

AUTHENTICATION SYSTEM, AUTHENTICATION DEVICE, AUTHENTICATION METHOD, AND PROGRAM

CROSS REFERENCE TO RELATED APPLICATIONS

This application is a National Stage of International Application No. PCT/JP2018/047906 filed on Dec. 26, 2018. The contents of the above document is incorporated herein by reference in its entirety.

TECHNICAL FIELD

The present invention relates to an authentication system, an authentication device, an authentication method, and a program.

BACKGROUND ART

There has hitherto been known an authentication technology for preventing impersonation by a third party. For example, in Patent Literature 1, there is described a system in which face photographs having a plurality of patterns are registered in advance, and face authentication is executed by using a face photograph having a suitable pattern.

CITATION LIST

Patent Literature

[Patent Literature 1] JP 2008-071366 A

SUMMARY OF INVENTION

Technical Problem

In such an authentication technology as described above, there is also authentication (e.g., password authentication) requiring a complete match of the authentication information, and there is also authentication (e.g., biometric authentication) in which a determination is performed based on similarity, which does not require a complete match of the authentication information. In the face authentication described in Patent Literature 1, a determination is performed based on similarity between face photographs having a plurality of patterns registered in advance and the face photograph photographed at the time of authentication. Therefore, when the face of a third party is similar, regardless of the pattern of the face photograph that is used, authentication may be successful and security cannot be sufficiently enhanced.

The present invention has been made in view of the above-mentioned problems. It is an object of the present invention to provide an authentication system, an authentication device, an authentication method, and a program, which are capable of sufficiently enhancing security.

Solution to Problem

In order to solve the above-mentioned problems, an authentication system according to one embodiment of the present invention includes: registration means for registering, for each user, first authentication information and second authentication information in storage means; first authentication means for performing first authentication based on a similarity between the first authentication information that has been input and the registered first authentication information; second authentication means for performing second authentication based on a match between the second authentication information that has been input and the registered second authentication information; and restriction means for restricting a plurality of users having similar first authentication information to each other from registering the same second authentication information as each other.

An authentication device according to one embodiment of the present invention, which is included in the authentication system, or which is communicable to and from the authentication system, includes: reception means for receiving an input operation; transmission means for transmitting, based on the input operation, information required for each of the first authentication and the second authentication; and processing execution means for executing predetermined processing when the first authentication and the second authentication are successful.

An authentication method according to one embodiment of the present invention includes: a registration step of registering, for each user, first authentication information and second authentication information in storage means; a first authentication step of performing first authentication based on a similarity between the first authentication information that has been input and the registered first authentication information; a second authentication step of performing second authentication based on a match between the second authentication information that has been input and the registered second authentication information; and a restriction step of restricting a plurality of users having similar first authentication information to each other from registering the same second authentication information as each other.

A program according to one embodiment of the present invention causes a computer to function as: registration means for registering, for each user, first authentication information and second authentication information in storage means; first authentication means for performing first authentication based on a similarity between the first authentication information that has been input and the registered first authentication information; second authentication means for performing second authentication based on a match between the second authentication information that has been input and the registered second authentication information; and restriction means for restricting a plurality of users having similar first authentication information to each other from registering the same second authentication information as each other.

According to one aspect of the present invention, the authentication system further includes acquisition means for acquiring the first authentication information on a user who has performed a predetermined registration application, the restriction means is configured to set the second authentication information on the user who has performed the predetermined registration application such that the set second authentication information is prevented from being the same as the second authentication information on another user having similar first authentication information to the user who has performed the predetermined registration application, and the registration means is configured to register the second authentication information set by the restriction means as the second authentication information on the user who has performed the predetermined registration application.

According to one aspect of the present invention, the acquisition means is configured to further acquire a part of the second authentication information specified by the user who has performed the predetermined registration application, and the restriction means is configured to set a remaining part of the second authentication information on the user who has performed the predetermined registration application such that the set second authentication information is prevented from being the same as the second authentication information on the another user.

According to one aspect of the present invention, the restriction means is configured to: identify, from among other users having the same part as the part of the user who has performed the predetermined registration application, another user having dissimilar first authentication information; and set the remaining part of the identified another user as the remaining part of the user who has performed the predetermined registration application.

According to one aspect of the present invention, the restriction means is configured to: identify, for each remaining part of the other users having the same part as the part of the user who has performed the predetermined registration application, other users having the most similar first authentication information to the first authentication information on the user who has performed the predetermined registration application; and set, as the remaining part of the user who has performed the predetermined registration application, the remaining part of another user from among the identified other users who has the most dissimilar first authentication information to the first authentication information on the user who has performed the predetermined registration application.

According to one aspect of the present invention, when there are no other users having dissimilar first authentication information among the other users having the same part as the part of the user who has performed the predetermined registration application, the restriction means sets a remaining part that is yet to be used, as the remaining part of the user who has performed the predetermined registration application.

According to one aspect of the present invention, the restriction means is configured to randomly set the second authentication information on the user who has performed the predetermined registration application such that the set second authentication information is prevented from being the same as the second authentication information on another user having similar first authentication information to the first authentication information on the user who has performed the predetermined registration application.

According to one aspect of the present invention, the first authentication means is configured to: extract the first authentication information on a user matching the second authentication information that has been input, from among pieces of first authentication information registered in the storage means; and perform the first authentication based on the first authentication information that has been input and the extracted first authentication information.

According to one aspect of the present invention, the first authentication information is biometric authentication information, the first authentication is biometric authentication, the second authentication information is a passcode having a predetermined number of digits, the second authentication is passcode authentication, and the restriction means is configured to restrict a plurality of users having similar biometric authentication information to each other from registering the same passcode as each other.

According to one aspect of the present invention, the registration means is configured to further register payment information in association with the first authentication information and the second authentication information, and the authentication system further includes processing execution means for executing, when the first authentication and the second authentication are successful, payment processing based on the payment information on a user for which the first authentication and the second authentication are successful.

Advantageous Effects of Invention

According to the present invention, it is possible to enhance security sufficiently.

BRIEF DESCRIPTION OF DRAWINGS

FIG. 5 is a diagram for illustrating how a user passes through a security gate.

FIG. 7 is a table for showing a data storage example of a user database.

DESCRIPTION OF EMBODIMENTS

1. Outline of Authentication System

Figure 1:
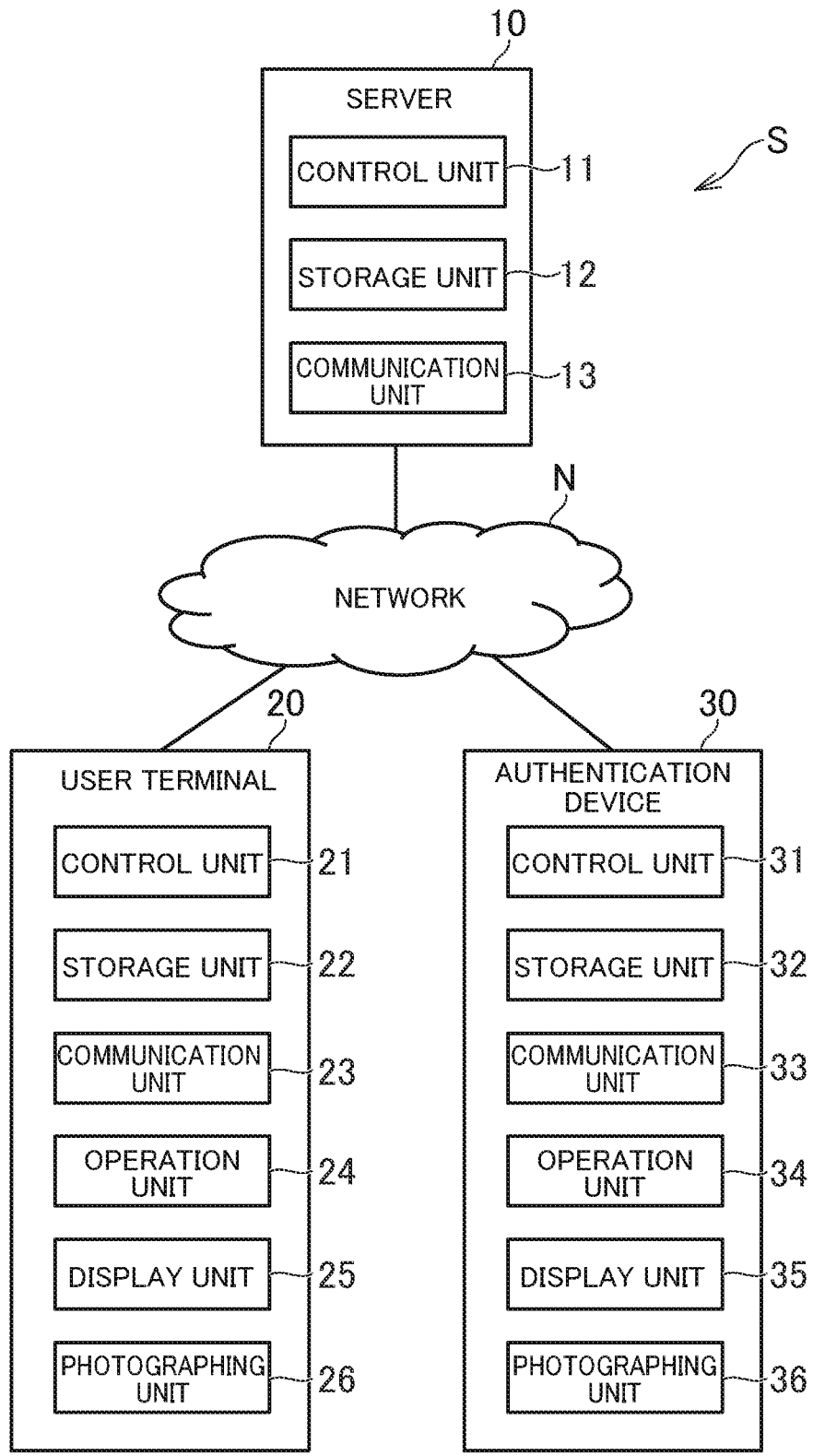
FIG. 1 is a diagram for illustrating an overall configuration of an authentication system.

There is now described an example of an authentication system according to an exemplary embodiment of the present invention. FIG. 1 is a diagram for illustrating an overall configuration of the authentication system. As illustrated in FIG. 1, an authentication system S includes a server 10, a user terminal 20, and an authentication device 30, each of which can be connected to a network N, for example, the Internet. In FIG. 1, there is illustrated one server 10, one user terminal 20, and one authentication device 30, but there may be a plurality of each of those.

The server 10 is a server computer. The server 10 includes a control unit 11, a storage unit 12, and a communication unit 13. The control unit 11 includes at least one microprocessor. The control unit 11 executes processing in accordance with programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a ROM, an EEPROM, a flash memory, or a hard disk drive. The communication unit 13 is a communication interface for wired communication or wireless communication, and performs data communication via the network N.

The user terminal 20 is a computer to be operated by a user. For example, the user terminal 20 is a cell phone (including smartphones), a portable information terminal (including tablet computers), or a personal computer. In this embodiment, the user terminal 20 includes a control unit 21, a storage unit 22, a communication unit 23, an operation unit 24, a display unit 25, and a photographing unit 26. The physical configuration of each of the control unit 21, the storage unit 22, and the communication unit 23 may be the same as those of the control unit 11, the storage unit 12, and the communication unit 13, respectively.

The operation unit 24 is an input device, and is, for example, a pointing device such as a touch panel and a mouse, a keyboard, or a button. The operation unit 24 transmits details of operation by the user to the control unit 21. The display unit 25 is, for example, a liquid crystal display unit or an organic EL display unit. The display unit 25 displays an image in accordance with an instruction of the control unit 21.

The photographing unit 26 includes at least one camera. For example, the photographing unit 26 includes an image pickup element such as a CCD image sensor or a CMOS image sensor, and records an image picked up by the image pickup element as digital data. The image may be a still image or a moving image picked up continuously at a predetermined frame rate.

The authentication device 30 is a computer to be used for authentication. For example, the authentication device 30 is a cell phone, a portable information terminal, or a personal computer. In this embodiment, the authentication device 30 includes a control unit 31, a storage unit 32, a communication unit 33, an operation unit 34, a display unit 35, and a photographing unit 36. The physical configuration of each of the control unit 31, the storage unit 32, the communication unit 33, the operation unit 34, the display unit 35, and the photographing unit 36 may be the same as those of the control unit 11, the storage unit 12, the communication unit 13, the operation unit 24, the display unit 25, and the photographing unit 26, respectively.

Programs and data to be described as being stored into the storage units 12, 22, and 32 may be supplied thereto via the network N. Further, the respective hardware configurations of the computers described above are not limited to the above-mentioned examples, and various types of hardware can be applied thereto. For example, the hardware configuration may include a reading unit (e.g., an optical disc drive or a memory card slot) configured to read a computer-readable information storage medium, or an input/output unit (e.g., a USB port) configured to input and output data to/from an external device. For example, the program and the data stored in the information storage medium may be supplied to each of the computers through intermediation of the reading unit or the input/output unit.

2. Outline of Authentication System

The authentication system S is configured to execute authentication in order to confirm the validity of the user in a suitable situation. The authentication is an action of confirming whether or not the user has a predetermined qualification, and may be referred to as "other-party authentication" or "personal authentication". The authentication system S can execute various types of authentication. For example, the authentication system S can execute biometric authentication, passcode authentication, password authentication, electronic stamp authentication, or countersign authentication.

Biometric authentication is an authentication method that uses a physical feature or behavioral characteristic of a human. Examples of biometric authentication that uses a physical feature includes face authentication, fingerprint authentication, DNA authentication, palm authentication, retina authentication, iris authentication, vein authentication, and voice authentication. Examples of biometric authentication that uses a behavioral feature includes handwriting authentication, key stroke authentication, lip movement authentication, eye blinking authentication, and gait authentication.

In this embodiment, processing of the authentication system S is described by using a situation in which the user passes through a security gate as an example. The authentication system S is applicable to various situations, as described in modification examples of the present invention later, and the situations to which the authentication system S is applied are not limited to the example of this embodiment.

Figure 2:
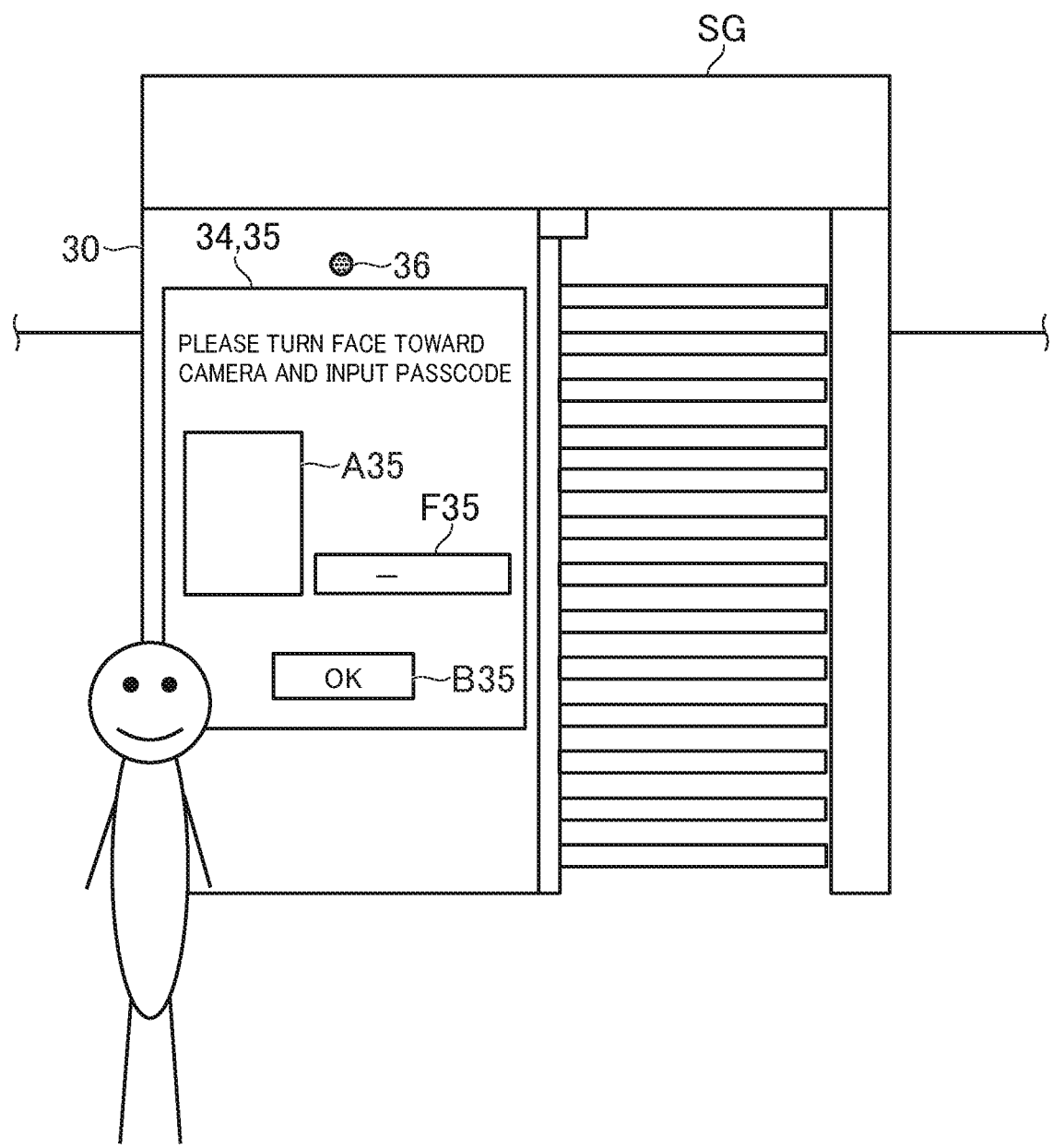
FIG. 2 is a diagram for illustrating an example of a situation in which the authentication system is used.

FIG. 2 is a diagram for illustrating an example of a situation in which the authentication system S is used. As illustrated in FIG. 2, a security gate SG includes a rotatable door, and is connected to the authentication device 30. The door of the security gate SG is locked by a lock mechanism, and is unlocked when user authentication is successful. When the lock is unlocked, the user can push the door to pass through the door. The door is locked again when the door is rotated by a predetermined angle. The door may be an opening and closing type of door, and the opening and closing may be controlled by an electronic lock.

For example, the security gate SG may be arranged at any facility, such as at a company for which the user works or at a public facility, and only those who are qualified to enter are allowed to pass through the security gate SG. In general, security gates using a card key are generally used, but when the user loses the card key, a third party who has acquired the card key may impersonate the user to pass through the security gate.

In this regard, when biometric authentication is used, unlike a card key, there is no risk of not being able to use biometric authentication. However, as described in the "background art" section, biometric authentication does not require an exact match of the face or the like, and whether or not authentication is successful is determined based on similarity. Therefore, for example, another person having a face similar to that of the user may impersonate the user to pass through the security gate.

Further, as described in the "background art" section, even when two-step authentication using biometric authentication and telephone number authentication is performed, the telephone number is information presumed to be publicly available, and therefore security cannot be sufficiently enhanced. In this regard, when passcode authentication is used in place of telephone number authentication, the passcode is generally not publicly available information, and therefore security can be enhanced to some extent.

However, passcodes are relatively short pieces of information (e.g., four-digit numbers), and a plurality of users having similar faces to each other may use the same passcode by chance. In this case, there is a possibility that a certain user A is authenticated as another user B, and the user A passes through the security gate by impersonating the user B.

Therefore, the authentication system S is configured to restrict each of the plurality of users having similar faces to each other from using the same passcode. The details of this configuration are described later, but there are a plurality of methods that may be used to perform the restriction. In this embodiment, when a user is caused to register a face photograph and a passcode as the information required for authentication, in place of causing the user to specify the entire passcode during authentication, the user is caused to specify only a part of the passcode. Such impersonation as described above is prevented by determining the remaining part of the passcode on the server 10 side in order to prevent users having similar faces to each other from registering the same passcode.

Figure 3:
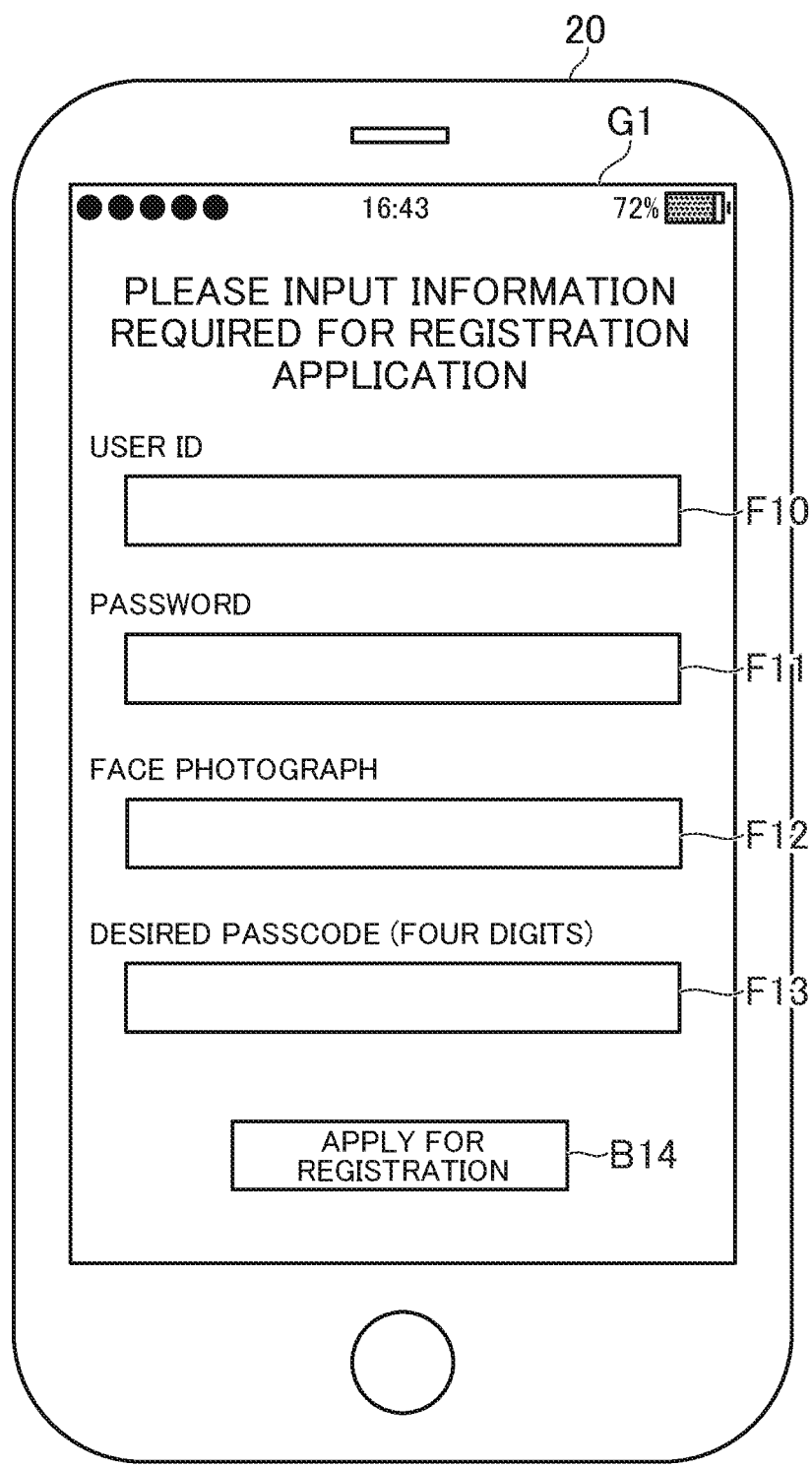
FIG. 3 is a diagram for illustrating an example of a registration application screen to be displayed on a user terminal.

FIG. 3 is a diagram for illustrating an example of a registration application screen to be displayed on the user terminal 20. The registration application screen is a screen for the user to perform a registration application of a face photograph and the like. As illustrated in FIG. 3, on a registration application screen G1, there are displayed an input form F10 for inputting a user ID, an input form F11 for inputting a password, an input form F12 for uploading a face photograph, an input form F13 for inputting the last four digits of a passcode, and a button B14 for performing a registration application.

The user ID is information for uniquely identifying the user. The password is a symbol string having any length specified by the user, and is information different from the passcode described above. "Symbol" refers to both numbers and letters. It is assumed that the user has already completed user registration for the authentication system S, the user ID has been issued, and the password has been specified. In this embodiment, the password is not used in order to pass through the security gate SG, but is used for another purpose, for example, changing the registration information on the user.

For example, a user who has stored his or her face photograph in the storage unit 22 of the user terminal 20 inputs a file name of the face photograph to the input form F12, and specifies the face photograph to be uploaded. That is, the user specifies in the input form F12 the face photograph to be used for face authentication. In this embodiment, in order to simplify the description, there is described a case in which only one face photograph is registered, but a plurality of face photographs may be registered. The user may also activate the photographing unit 26 to photograph a face photograph on the spot.

As another example, the user inputs any four-digit numerical value to the input form F13. When the user inputs information to each of the input forms F10 to F13 and selects the button B14, the first digit of the passcode is determined on the server 10 side, and a registration completion screen indicating that registration is complete is displayed on the display unit 25.

Figure 4:
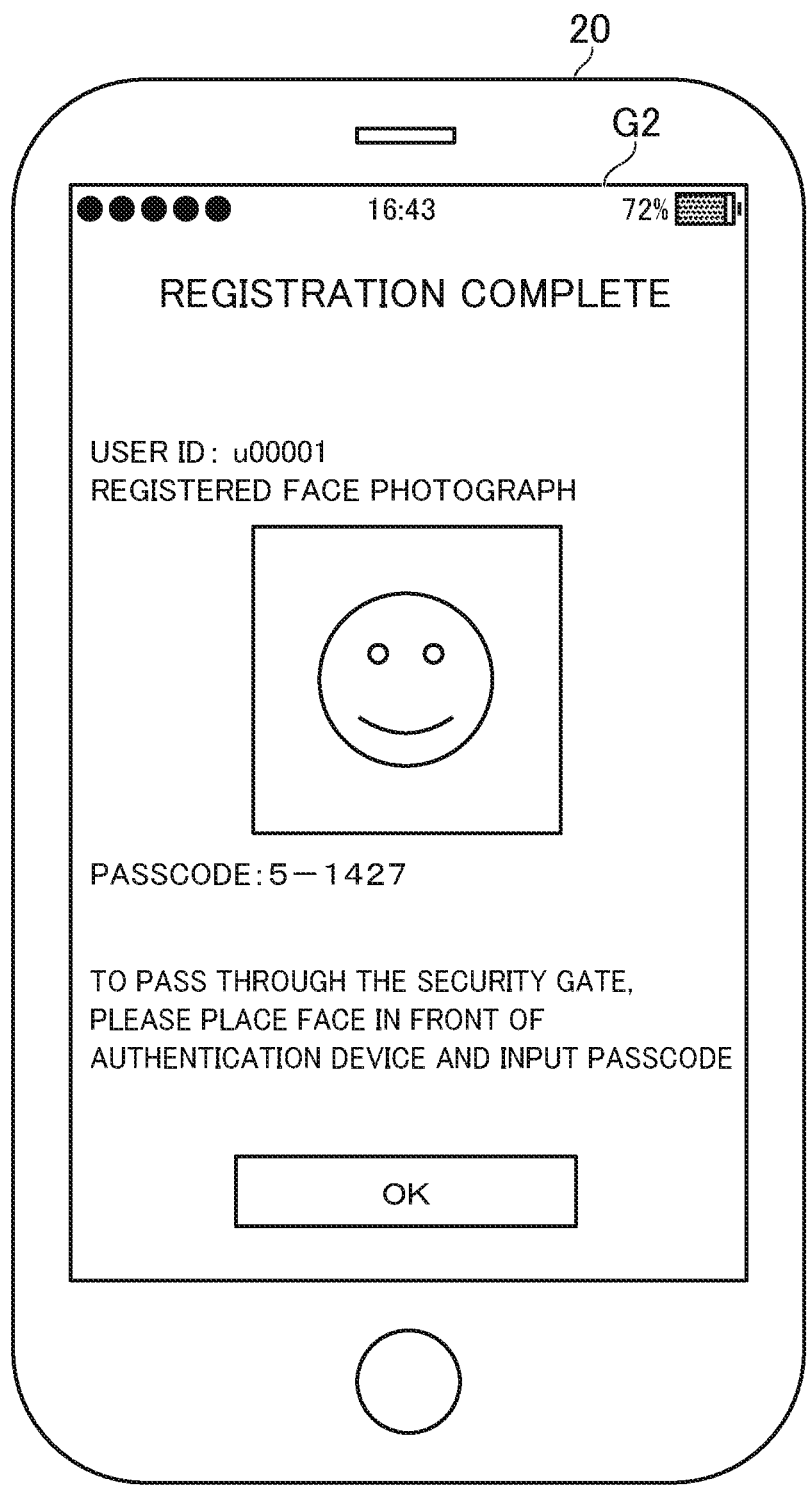
FIG. 4 is a diagram for illustrating an example of a registration completion screen.

FIG. 4 is a diagram for illustrating an example of the registration completion screen. As illustrated in FIG. 4, a registration completion screen G2 displays, in addition to a message indicating that registration is complete, the user ID of the user who has performed the registration application, the face photograph registered in the user database DB, and the passcode of the user.

In the example of FIG. 4, the passcode of the user is "5-1427". The number "5" in the first digit is a numerical value determined by the server 10 such that the pass coat is not the same as that of another user having a similar face, and the number "1427" from the second to the fifth digits are numerical values determined by the user. For example, when another user having a similar face has specified "1427" during the registration application, the another user may be assigned a passcode such as "1-1427" or "3-1427", but because the first digit is different, the passcodes are not the same and thus impersonation can be prevented.

The hyphen between the first and second digits is not a part of the passcode, and the user is not required to input the hyphen. When registration of the face photograph and the passcode is complete, the user can receive authentication for passing through the security gate SG.

FIG. 5 is a diagram for illustrating how a user passes through the security gate SG. As illustrated in FIG. 5, the user causes the photographing unit 36 to photograph his or her face in accordance with guidance displayed on the display unit 35 of the authentication device 30. For example, an image photographed by the photographing unit 36 is displayed in a display area A35 of the display unit 35. The user operates the operation unit 34 to input the five-digit passcode notified by the registration completion screen G2 in an input form F35 displayed on the display unit 35.

When the user selects an OK button B35, the image photographed by the photographing unit 36 and the passcode input to the input form F35 are transmitted to the server 10, and face authentication and passcode authentication are executed. As illustrated in FIG. 5, when those two authentications are successful, the security gate SG is unlocked, and the user can pass through the security gate SG.

As described above, authentication system S of this embodiment sufficiently enhances security by causing the user to specify a part of the passcode such that users having similar faces do not have the same passcode, and causing the remaining part of the passcode to be determined on the authentication system S side. The details of this technology are now described.

3. Functions to be Implemented by Authentication System

Figure 6:
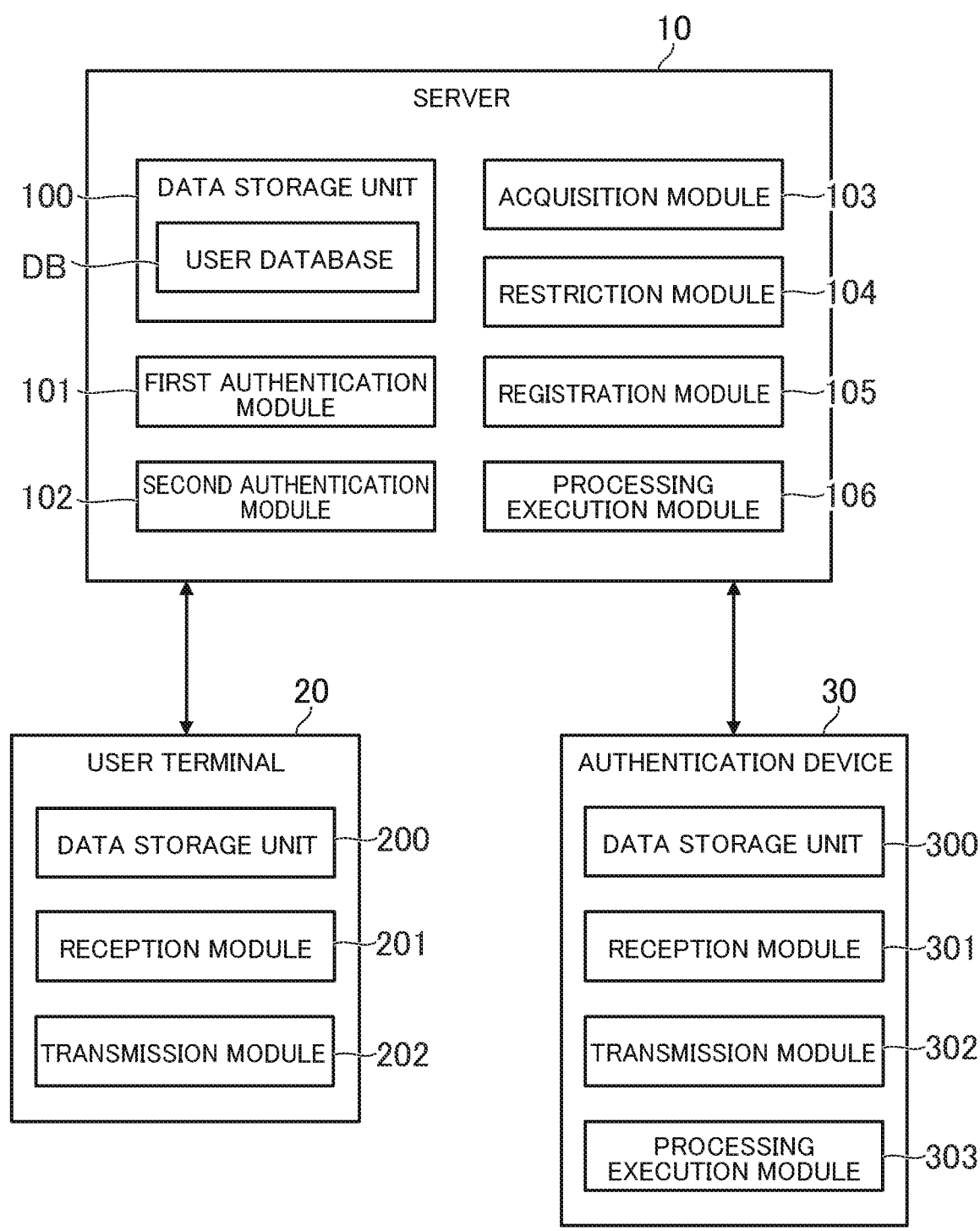
FIG. 6 is a functional block diagram for illustrating an example of functions to be implemented by the authentication system according to an embodiment of the present invention.

FIG. 6 is a functional block diagram for illustrating an example of functions to be implemented by the authentication system S of this embodiment. In this example, the functions to be implemented by each of the server 10, the user terminal 20, and the authentication device 30 are described.

[3-1. Functions to be Implemented by Server]

As illustrated in FIG. 6, in the server 10, a data storage unit 100, a first authentication module 101, a second authentication module 102, an acquisition module 103, a restriction module 104, a registration module 105, and a processing execution module 106 are implemented.

[Data Storage Unit]

The data storage unit 100 is mainly implemented by the storage unit 12. The data storage unit 100 is configured to store the data required for authentication. As an example of the data stored in the data storage unit 100, there is described a user database DB, in which various types of information relating to the user are stored.

FIG. 7 is a table for showing a data storage example of the user database DB. As shown in FIG. 7, the user database DB stores a user ID, a name of the user, a password, data of an uploaded face photograph, a feature amount of the face calculated from the face photograph, and a passcode. The information stored in the user database DB is not limited to those items, and any information may be stored, such as contact information and the address of the user.

The password, the feature amount of the face, and the passcode are a kind of authentication information. The authentication information is information to be referred to during authentication, and a name thereof varies depending on the authentication method. For example, in the case of electronic stamp authentication, a multi-touch pattern of the stamp is the authentication information, and in the case of countersign authentication, the countersign is the authentication information. Each of the password, the feature amount of the face, and the passcode may be used for any purpose. In this embodiment, the password is used in order for the user to perform a registration application or edit registered information, and the feature amount of the face and the passcode are used in order for the user to pass through the security gate.

The feature amount of the face is information obtained by quantifying a feature of the face, and indicates features such as a relative position, size, or shape of a facial part. In this embodiment, the feature amount of the face indicated by the face photograph is calculated in advance, but the feature amount of the face may be calculated on the spot at the time of authentication. When a plurality of face photographs are to be registered, the feature amount of the face is calculated for each face photograph. Various methods are applicable for the actual face authentication. For example, a method such as principal component analysis, linear discriminant analysis, elastic matching, hidden Markov model is usable, and the feature amount is only required to be calculated by a calculation expression corresponding to those methods. For example, the feature amount of the face is assumed to be represented by a multi-dimensional vector, but it may be represented in another form, such as an array or a single numerical value. The feature amount of the face is an example of the first authentication information in the present invention.

The first authentication information is authentication information to be used in first authentication. The first authentication is authentication based on similarity of the authentication information. "Similarity" is whether or not the input authentication information and the registered authentication information are similar to each other. In other words, "similarity" is a difference between the input authentication information and the registered authentication information.

The input authentication information is authentication information input to the computer during authentication. For example, the authentication information may be authentication information input by a user operation, or may be authentication information input based on a detection result obtained by a sensor, such as the photographing unit 36. In this embodiment, the password input to the input form F11, the feature amount of the face indicated by the photographed image of the photographing unit 36, and the passcode input to the input form F35 are examples of the input authentication information.

The registered authentication information is authentication information registered in advance, and is authentication information that may be a correct answer during authentication. In other words, the registered authentication information is information to be compared with the input authentication information. In this embodiment, the password, feature amount of the face, and passcode stored in the user database DB are examples of the registered authentication information.

In the first authentication, a similarity degree is calculated based on the input authentication information and the registered authentication information. The "similarity degree" is an index indicating the degree of similarity. In other words, the "similarity degree" is an index indicating how small the difference is between the input authentication information and the registered authentication information. A higher similarity degree indicates that the input authentication information and the registered authentication information are similar to each other, and a lower similarity degree indicates that the input authentication information and the registered authentication information are not similar to each other. The similarity degree can also be referred to as "probability that the input authentication information and the registered authentication information are similar to each other". The similarity degree may be expressed as a percentage between 0% and 100%, or may be expressed within another numerical range.

In this embodiment, as an example, there is described a case in which the first authentication information is biometric authentication information and the first authentication is biometric authentication. Further, the feature amount of the face is described as a specific example of the biometric authentication information, and face authentication is described as a specific example of biometric authentication. For this reason, in this embodiment, the expressions "biometric authentication information" and "feature amount of the face" can be read as "first authentication information", and the expressions "biometric authentication" and "face authentication" can be read as "first authentication".

As described above, the passcode is a number having a predetermined number of digits that is used for authentication. The passcode is sometimes referred to as "personal identification number (PIN)" or "code number". The passcode and the password are similar concepts, but differ in that the passcode is composed of only numbers, whereas the password may be composed of any kind of symbol. In this embodiment, the passcode has a fixed number of digits, whereas the password can be set to have any number of digits. It is not required that the number of digits of the passcode be determined. The passcode is an example of the second authentication information.

The second authentication information is authentication information to be used in second authentication. The second authentication is authentication based on a match between the authentication information. A "match" means that the input authentication information and the registered authentication information are the same. In this example, a "match" means a complete match, and not a partial match. For this reason, the second authentication is not successful when even a portion of the authentication information is different.

In this embodiment, as an example, there is described a case in which the second authentication information is a passcode having a predetermined number of digits and the second authentication is passcode authentication. For this reason, in this embodiment, the term "passcode" can be read as "second authentication information", and the expression "passcode authentication" can be read as "second authentication".

[First Authentication Module]

The first authentication module 101 is mainly implemented by the control unit 11. The first authentication module 101 is configured to perform first authentication based on the similarity between the input first authentication information and the registered first authentication information. In this embodiment, the first authentication information is a feature amount of the face and the first authentication is face authentication, and therefore the first authentication module 101 performs face authentication based on the similarity between the input feature amount of the face and the registered feature amount of the face.

For example, when the face of the user is to be photographed by the authentication device 30, the first authentication module 101 calculates the input feature amount of the face based on the image photographed by the authentication device 30. The first authentication module 101 also refers to the user database DB to acquire the registered feature amount of the face. When the input feature amount of the face and the registered feature amount of the face are similar, the first authentication module 101 determines that authentication is successful, and determines that authentication has failed when the input feature amount of the face and the registered feature amount of the face are not similar.

For example, the first authentication module 101 calculates the similarity degree based on the input feature amount of the face and the registered feature amount of the face. The first authentication module 101 may use a difference between those feature amounts (e.g., distance between vectors indicated by each feature amount) as it is as the similarity degree, or may calculate the similarity degree by substituting those feature amounts into a predetermined calculation formula (e.g., a calculation formula weighted for each element of the vectors indicated by the feature amounts). The first authentication module 101 determines that authentication is successful when the similarity degree is equal to or more than a threshold value, and determines that authentication has failed when the similarity degree is less than the threshold value.

When the face photograph itself is used as the first authentication information in place of the feature amount of the face, the first authentication module 101 may calculate the similarity degree between an input face photograph and a registered face photograph. Various methods are applicable as the method of calculating the similarity degree between the input face photograph and the registered face photograph. For example, a method of calculating a difference between pixel values of pixels in the images may be used, or the similarity degree calculation used in machine learning may be used.

In face authentication, which is the first authentication, all the feature amounts of the faces registered in the user database DB may be compared. However, in this embodiment, the first authentication module 101 extracts, from among the feature amounts of the faces registered in the user database DB, the feature amount of the face of the user matching the input passcode. Specifically, in this embodiment, passcode authentication, which is the second authentication, is executed first, and after the feature amounts of the faces to be compared have been narrowed down by the first authentication, biometric authentication, which is the first authentication, is executed. The first authentication module 101 uses the extracted feature amount of the face in the user database DB as the feature amount to be compared with the input feature amount of the face. Specifically, the first authentication module 101 uses a record in the user database DB matching the input passcode as the feature amount to be compared with the input feature amount of the face.

The user may be requested to input his or her user ID or name during authentication. In this case, the first authentication module 101 may use only the feature amount of the face associated with the input user ID or name as the comparison target.

[Second Authentication Module]

The second authentication module 102 is mainly implemented by the control unit 11. The second authentication module 102 is configured to perform second authentication based on the similarity between the input second authentication information and the registered second authentication information. In this embodiment, the second authentication information is a passcode having a predetermined number of digits, and the second authentication is passcode authentication. Therefore, the second authentication module 102 performs passcode authentication based on a match between an input passcode and a registered passcode. The second authentication module 102 determines that authentication is successful when the input passcode and the registered passcode match, and determines that authentication has failed when the input passcode and the registered passcode do not match.

In this embodiment, passcode authentication is executed first in order to narrow down the feature amounts of the faces to be compared in face authentication, and therefore all of the passcodes registered in the user database DB are compared. For this reason, the second authentication module 102 identifies all records storing a passcode matching the input passcode. The second authentication module 102 determines that authentication has failed when no records matching the input passcode are found, and determines that the authentication is successful when even one record matching the input passcode is found. The feature amount of the face stored in the record that is found when authentication is successful is the feature amount to be compared in face authentication.

Contrary to this embodiment, biometric authentication, which is the first authentication, may be executed first, and passcode authentication, which is the second authentication, may be executed later. In this case, all the feature amounts of the faces registered in the user database DB are compared in biometric authentication, and the passcodes to be compared in passcode authentication are narrowed down. In this case, only the passcodes stored in the records for which biometric authentication is determined to be successful are compared in passcode authentication.

[Acquisition Module]

The acquisition module 103 is mainly implemented by the control unit 11. The acquisition module 103 is configured to acquire the first authentication information on the user who has performed a predetermined registration application. In this embodiment, the feature amount of the face is the first authentication information, and therefore the acquisition module 103 acquires the feature amount of the face of the user. The acquisition module 103 calculates the feature amount of the face based on the face photograph acquired from the user terminal 20, and stores the acquired feature amount of the face in the user database DB.

The registration application is an application for registering the first authentication information and the second authentication information. In this example, the registration application is an application for registering the feature amount of the face and the passcode. The registration application is performed by performing a procedure determined in advance. In this embodiment, there is described a case in which the registration application is performed electronically, but the registration application may also be performed by using a physical document, and the information on the face photograph and the like may be registered by an operator, for example. As described above, in this embodiment, it is assumed that the user has already completed user registration for the authentication system S and has registered his or her user ID and password. When the user subsequently accesses the server 10, the registration application screen G1 is displayed on the display unit 25, and the registration application can be performed.

When the face photograph itself is to be used as the first authentication information, the first authentication module 101 may store a face photograph acquired from the user terminal 20 as it is in the user database DB as the first authentication information.

The acquisition module 103 may acquire only the feature amount of the face, but in this embodiment, the acquisition module 103 acquires the part of the passcode specified by the user who has performed the registration application. This part is apart forming the second authentication information. The part may be any of a first half, a second half, or a middle part of the second authentication information. The length (information amount) of the part may be freely set.

Of the second authentication information, the part to be specified by the user may differ depending on the user, but in this embodiment, there is described a case in which the part to be specified by the user is determined in advance, and the same part is specified for all users. For example, rather than specifying the last four digits of the passcode for a given user and specifying the first four digits of the passcode for another user, the last four digits of the passcode are specified for all users. This is to make it easier to group the users based on the part generated on the system side (e.g., first digit of passcode).

As in this embodiment, in a case in which the passcode is the second authentication information, when the passcode is n digits (n is an integer of 2 or more), k digits (k is an integer of 1 or more and less than n) of those n digits correspond to the part. In this embodiment, the restriction module 104, which is described later, determines the first "n-k" digits of the passcode, and hence there is described a case in which the user specifies the last k digits of the passcode. In the example of FIG. 4, the value of n is 5, the value of k is 4, and the user specifies the last four digits.

The restriction module 104 may also be configured to determine the last "n-k" digits of the passcode. In this case, the user specifies the first k digits of the passcode. For example, when the user specifies "1427" and the restriction module 104 determines "5", the passcode of the user is "1427-5".

The ratio of the passcode specified by the user (ratio of k to n) may be freely set. When this ratio is higher, the part specified by the user becomes longer, and hence the user is less likely to forget the passcode. When this ratio is lower, the part generated on the system side becomes longer, and hence security is enhanced. The ratio can thus be said to be a trade-off between ease of remembering and security. In this embodiment, the part of the passcode specified by the user is longer than the remaining part of the passcode generated on the system side, and emphasis is placed on ease of remembering, but the remaining part may be longer than the part specified by the user to emphasize security.

[Restriction Module]

The restriction module 104 is mainly implemented by the control unit 11. The restriction module 104 is configured to restrict a plurality of users having similar first authentication information to each other from registering the same second authentication information as each other.

The phrase "having similar first authentication information to each other" means that the first authentication information on each of the plurality of users is similar. In this case, the term "similar" means having a similarity degree that is equal to or more than a threshold value. The phrase "the same second authentication information as each other" means that the second authentication information on each of the plurality of users matches. In this case, the term "match" has the same meaning as described above. In this embodiment, a match is a complete match between those pieces of second authentication information, and when even a portion of the information is different, there is no match.

The term "restrict" means controlling such that a plurality of users having similar first authentication information to each other do not register the same second authentication information as each other. There exist a plurality of restriction methods. In this embodiment, one of those methods is described, and other methods are described in the modification examples. In this embodiment, the first authentication information is a feature amount of the face and the second authentication information is a passcode, and therefore there is described a method of restricting a plurality of users having a similar feature amount of the face (example of biometric authentication information) to each other from registering the same passcode as each other.

For example, the restriction module 104 sets the passcode of the user who has performed the registration application such that the passcode is not the same as the passcode of another user having a similar feature amount of the face to the user who has performed the registration application. In this case, the "setting" is to determine on the computer side a part or all of the content of the passcode.

In this embodiment, the user who has performed the registration application specifies a part of the passcode, and therefore the restriction module 104 sets the remaining part of the passcode of the user who has performed the registration application such that the passcode is not the same as the passcode of another user.

The remaining part is, of the second authentication information, the part other than the part specified by the user. The remaining part may be any of the first half part, the second half part, or the middle part of the second authentication information, and the length of the remaining part may be freely set. For example, when the user specifies the first half, the remaining part is the second half. As another example, when the user specifies the second half, the remaining part is the first half. As another example, when the user specifies the middle part, the remaining part is the first half part and the second half part.

In a case in which the passcode is the second authentication information as in this embodiment, "n-k" digits, which is obtained by subtracting k digits specified by the user from the n digits of the passcode, corresponds to the part. In the example of FIG. 6, the value of n is 5, the value of k is 4, and the user specifies the first four digits, and therefore the remaining part is the last one digit. It is sufficient for the remaining part to be determined in accordance with the number of digits specified by the user, and for example, when the number of digits specified by the user is 3 digits or less, the remaining part, that is, "n-k" digits, is 2 or more digits. As another example, when the user specifies the first k digits, the remaining part is the last "n-k" digits.

Figure 8:
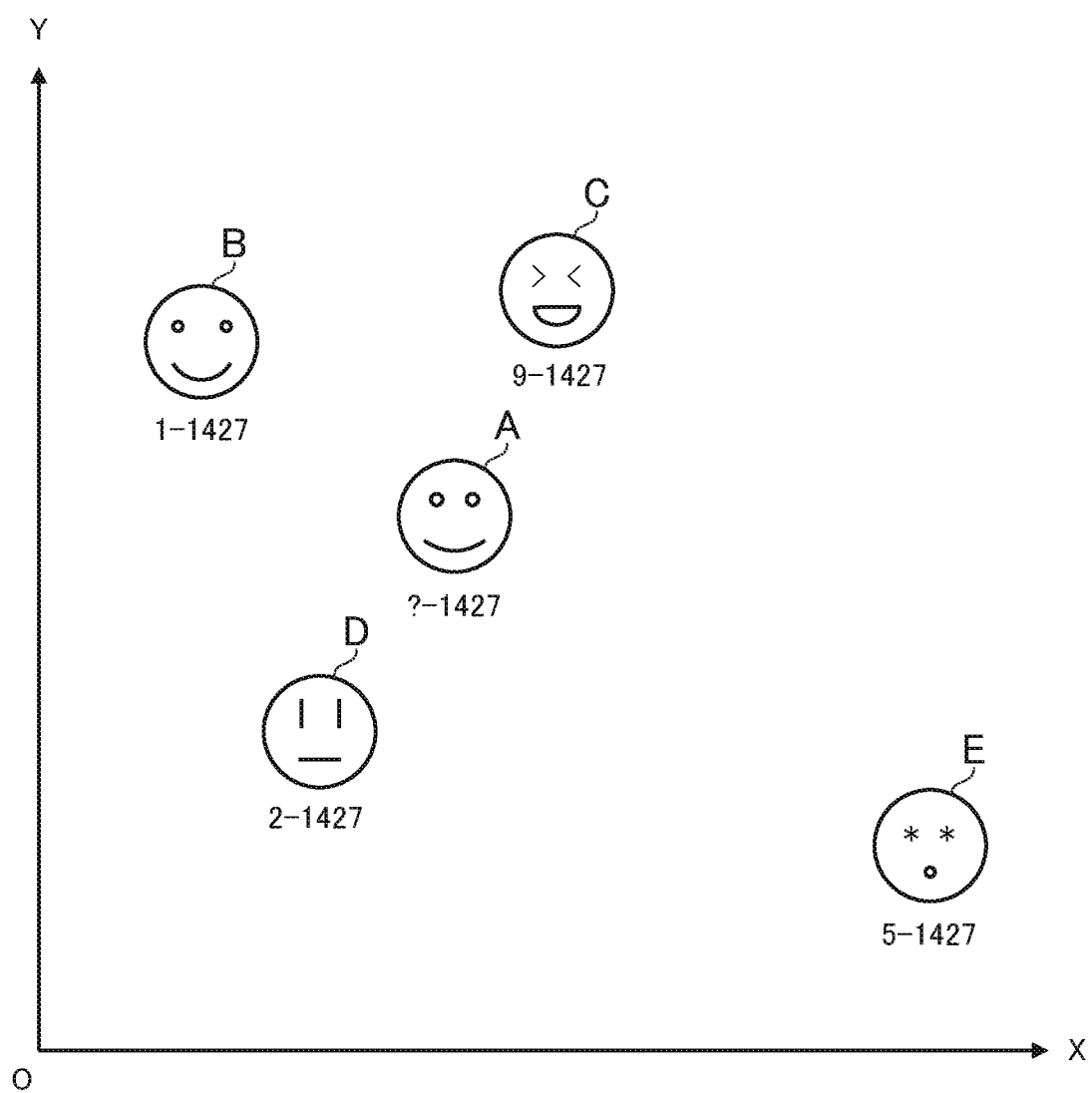
FIG. 8 is a graph for showing an example of processing of a restriction module.

FIG. 8 is a graph for showing an example of processing of the restriction module 104. There is described a case here in which the feature amount of the face of the user is represented by an m-dimensional vector (m is a natural number). In practice, the feature amount of the face is often represented by a vector of several tens to several hundreds of dimensions. However, in FIG. 8, in order to simplify the description, there is described a case in which the value of m is 2 and the feature amount of the face is represented by two-dimensional coordinates.

For example, it is assumed that a user A performs a registration application, and has specified a face photograph and the four digits "1427". Even when there is a user having a similar face among the registered users, his or her passcode is not the same as that of the user A unless "1427" is specified. For this reason, the restriction module 104 refers to the user database DB and retrieves users who have specified the same four digits as the "1427" specified by the user A who has performed the registration application (users for which the last four digits of the passcode are "1427").

When there is a user having a similar face to the user A among the retrieved users, for those users, setting the remaining one digit of the passcode to be the same means that there are users having a similar face and a completely matching passcode, and hence it is possible for those users to impersonate each other. In order to avoid such impersonation, the restriction module 104 determines the remaining one digit of the passcode of the user A such that the passcode does not completely match the passcode of users having a similar face to the user A among the retrieved users.

The restriction module 104 may determine a numerical value that is not being used by any of the retrieved users as the remaining one digit of the passcode of the user A. In this case, however, the passcode may quickly run out of available numerical values for the first digit. In this regard, for users having a face that does not resemble the face of the user A at all, even when the passcode matches, face authentication is not successful in the first place, and hence the probability of impersonation is extremely low.

Therefore, in this embodiment, the restriction module 104 identifies, from among the other users having the same part of the passcode (in this example, the last four digits) as the user who has performed the registration application, other users having a dissimilar feature amount of the face, and sets the remaining part of the passcode of an identified another user (in this example, the first digit) as the remaining part of the user who has performed the registration application.

For example, as the remaining part of the user who has performed the registration application, the restriction module 104 sets the remaining part of another user from among the identified other users who has the most dissimilar feature amount of the face to that of the user who has performed the registration application. The term "most dissimilar" means that the similarity degree is the lowest, which means that the distance is the longest in the coordinate system of FIG. 8.

In the example of FIG. 8, the restriction module 104 identifies, from among users B to E who have registered a face photograph and the like, the users having a dissimilar feature amount of the face from the user A who has performed the registration application. For two-dimensional coordinates like those in FIG. 8, the difference in feature amount of the face is expressed as distance, and therefore a distance that is further away means that the feature amount of the face is more dissimilar. For this reason, the restriction module 104 identifies the users having a dissimilar feature amount of the face based on the distance between the feature amount of the face of the user A and the feature amount of the face of each of the users B to E.

In the example of FIG. 8, the user E is farthest from the user A, and therefore the user E is the user having the most dissimilar face to that of the user A. For this reason, the restriction module 104 determines the first digit "5" of the passcode of the user E as the first digit of the passcode of the user A. In this case, the user A and the user E have the same passcode "5-1427", but because the faces of the user A and the user E are not similar to each other at all, the first authentication is never successful. For this reason, available first digits of the passcode can be prevented from running out while also ensuring security.

As described above, the restriction module 104 may identify the user who is the farthest away, but as long as the distance is equal to or more than a threshold value, face authentication is guaranteed not to be successful, and hence the restriction module 104 may identify any user among the users having a distance equal to or more than the threshold value in place of the user who is the farthest away. The restriction module 104 may also determine the remaining part being used by the identified user as the remaining part of the user A.

It is possible that all of the other users having the same last four digits for their passcode may have a similar face to that of the user who has performed the registration application. When there are no other users having a dissimilar feature amount of the face among the other users having the same part of the passcode as the user who has performed the registration application, the restriction module 104 sets, as the remaining part of the user who has performed the registration application, a passcode remaining part that is not being used.

In the example of FIG. 8, assuming that all of the users B to E have a similar face to the user A, the first digit of the user A is assigned a numerical value that has not been assigned to anyone else. For example, the restriction module 104 determines any numerical value (e.g., "7") other than "1", "2", "5", or "9", which are the first digits used by the users B to E, as the first digit of the user A. When all the numerical values of from 0 to 9 are being used by other users having a similar face to the user A, a two-digit numerical value may be set as the remaining part of the user A, or an alphabetic letter may be used in place of a numerical value.

When the passcode is set as described above, there may be a plurality of users who have exactly the same five-digit passcode. In the example of FIG. 8, the user A and the user E have exactly the same passcode. In such a case, the users having a dissimilar feature amount of the face may be identified from among all the other users having the same last four digits specified by the user who has performed the registration application, but for a plurality of users having exactly the same passcode, it is sufficient to select only the user having the closest distance for comparison.

Therefore, the restriction module 104 may identify, for each remaining part (in this case, the first digit) of the other users having the same part as the user who has performed the registration application, other users having the most similar feature amount of the face to that of the user who has performed the registration application, and set, as the remaining part of the user who has performed the registration application, the remaining part of another user from among those identified other users who has the most dissimilar feature amount of the face to that of the user who has performed the registration application.

For example, the restriction module 104 groups, based on the first digit of the passcode, the other users having the same last four digits as the passcode specified by the user who has performed the registration application. The first digit of the passcode can be said to be group identification information. The restriction module 104 identifies, for each group, the other users having the most similar face to that of the user who has performed the registration application, determines that the users other than those identified other users are not to be compared with the feature amount of the face of the user who has performed the registration application, and determines that those identified other users are to be compared with the feature amount of the face of the user who has performed the registration application.

Figure 9:
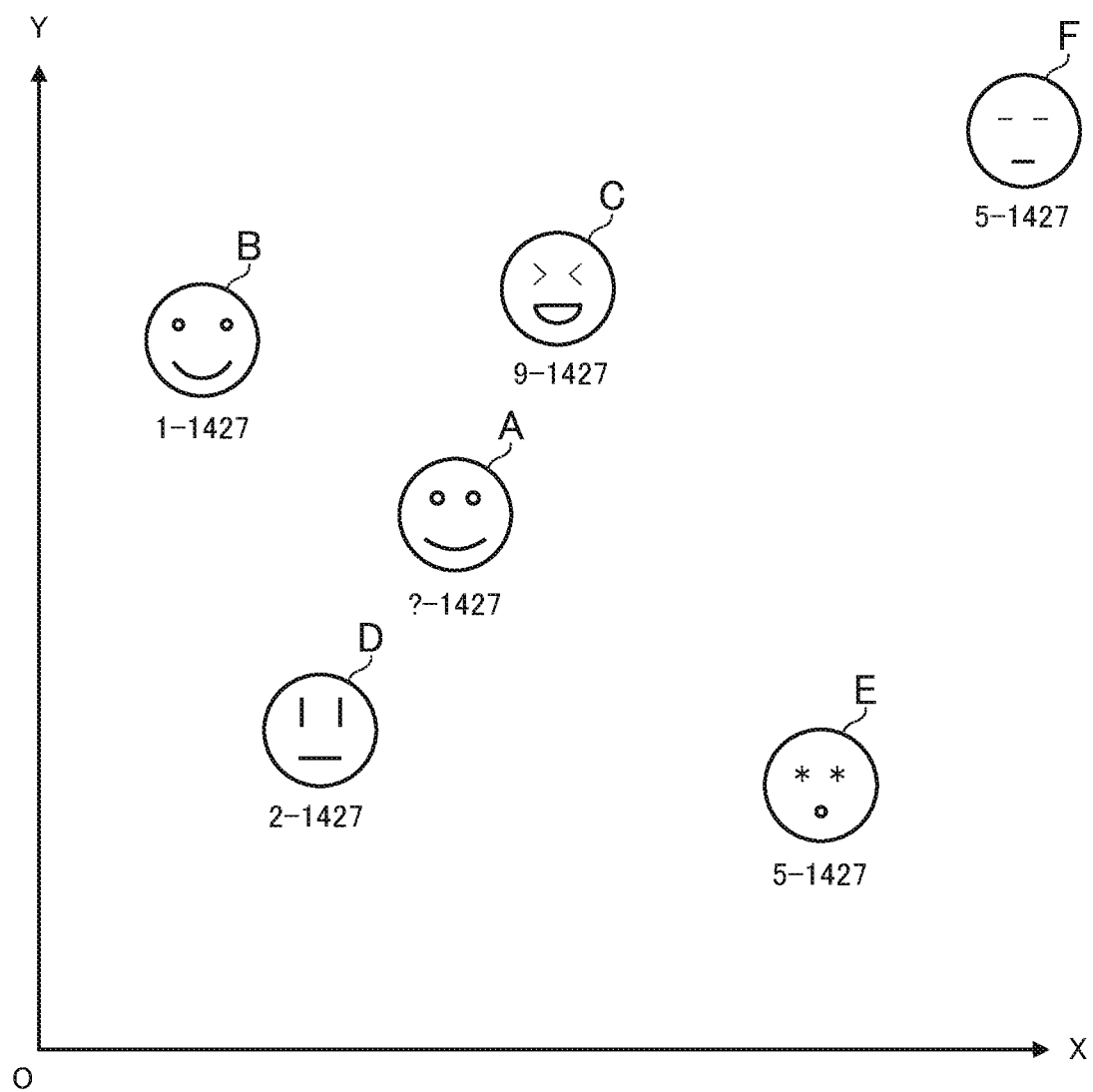
FIG. 9 is a graph for showing an example of a case in which there are a plurality of users each having an identical passcode.

FIG. 9 is a graph for showing an example of a case in which there are a plurality of users having exactly the same passcode. As shown in FIG. 9, it is assumed that there is a user F having exactly the same password as that of the user E. The users E and F have exactly the same passcode, but are far away from each other (faces are not similar), and it is not possible for the users E and F to impersonate each other. Therefore, there is no problem even when the passcodes are exactly the same. Users having similar faces are not assigned the same passcode, and therefore grouping is performed such that users having similar faces to each other belong to different groups.

For example, it is assumed that the user E has a face that is more similar to the user A than the user F, who has the same passcode, and is closer than the user F. In this case, as long as it can be confirmed that the faces of the user A and the user E are not similar to each other, the user F, who is farther away, also does not have a similar face to the user A, as a matter of course. For this reason, the restriction module 104 may exclude the user F from the comparison target of the face with the user A.

In the example of FIG. 9, the restriction module 104 does not compare the user F with the user A, but does compare the users B to E with the user A. Among those four people, when there is a user having a face that is not similar to the user A, the first digit of that user is set as the first digit of the user A. When all of those four people have a similar face to the user A, the first digit of the user A is assigned a numerical value that has not been assigned to anyone else.

The processing of the restriction module 104 is not limited to the example described above. For example, the restriction module 104 may randomly set the passcode of the user who has performed the registration application such that the passcode is not the same as the passcode of another user who has a similar feature amount of the face to the user who has performed the registration application. In this case, the restriction module 104 identifies other users having a feature amount of the face similar to that of the user who has performed the registration application, and refers to the passcodes of the identified other users. The restriction module 104 randomly determines a numerical value that is not being used as the first digit of the referenced passcodes. For example, the restriction module 104 may randomly determine the first digit of the passcode until a certain number of registrations are accumulated.

[Registration Module]

The registration module 105 is mainly implemented by the control unit 11. The registration module 105 is configured to register in the data storage unit 100 the first authentication information and the second authentication information for each user. The registration module 105 registers the first authentication information and the second authentication information in the data storage unit 100 in association with the user ID. The term "registration" means writing data in a memory and storing the data in a data database. A combination of the user, the first authentication information, and the second authentication information have a one-to-one relationship. In other words, one set of first authentication information and second authentication information is registered for one user.

In this embodiment, the feature amount of the face is the first authentication information and the passcode is the second authentication information, and therefore the registration module 105 registers, for each user, the feature amount of the face and the passcode in the user database DB.

For example, the passcode is set by the restriction module 104 when the user performs a registration application, and therefore the registration module 105 registers the passcode set by the restriction module 104 as the passcode of the user who has performed the registration application.

[Processing Execution Module]

The processing execution module 106 is mainly implemented by the control unit 11. The processing execution module 106 is configured to execute predetermined processing based on the result of each of the first authentication and the second authentication. For example, the processing execution module 106 does not execute the predetermined processing when any one of the first authentication and the second authentication fails, and executes the predetermined processing when the first authentication and the second authentication are both successful.

The predetermined processing is processing permitted to be executed when authentication is successful. In this embodiment, there is described a case in which processing for unlocking the security gate SG corresponds to the predetermined processing, but any processing is applicable as the predetermined processing. Examples of the predetermined processing include login processing to a server or a terminal, processing of unlocking a computer, processing of permitting data browsing, processing of permitting data writing, processing of opening and closing an automatic door, processing of permitting electronic voting, and processing of permitting acquisition of a public document.

When any one of the first authentication and the second authentication fails, the processing execution module 106 does not permit the security gate SG to be unlocked, and when the first authentication and the second authentication are both successful, permits the security gate SG to be unlocked. The processing execution module 106 may control the unlocking, but in this embodiment, the processing execution module 303 of the authentication device 30 executes the unlocking control, and therefore the processing execution module 106 notifies an authentication result to the authentication device 30. For example, when any one of the first authentication and the second authentication fails, the processing execution module 106 does not transmit a notification indicating that authentication has been successful, and when the first authentication and the second authentication are both successful, transmits a notification indicating that authentication has been successful. When the authentication by the user has not been successful a certain number of times, the authentication information on the record storing the passcode input by the user or the record storing the feature amount similar to the face of the user may be locked and prevented from being used.

[3-2. Functions to be Implemented by User Terminal]

As illustrated in FIG. 6, in the user terminal 20, a data storage unit 200, a reception module 201, and a transmission module 202 are implemented.

[Data Storage Unit]

The data storage unit 200 is mainly implemented by the storage unit 22. The data storage unit 200 is configured to store the data required for the registration application. For example, the data storage unit 200 stores data of the face photograph of the user. The data storage unit 200 may also store a user ID and a password.

[Reception Module]

The reception module 201 is mainly implemented by the control unit 21. The reception module 201 is configured to receive input operations for the user to perform a registration application. For example, the receiving unit 201 receives an operation of inputting the user ID to the input form F10. As another example, the reception module 201 receives an operation of inputting the password to the input form F11. As another example, the reception module 201 receives an operation of inputting a file name of a face photograph to the input form F12. As another example, the reception module 201 receives a specification of the part of the passcode to the input form F13. The input operations received by the reception module 201 are not limited to those examples, and various other input operations may be received.

[Transmission Module]

The transmission module 202 is mainly implemented by the control unit 21. The transmission module 202 is configured to transmit data for performing the registration application, based on an input operation received by the reception module 201. In this embodiment, there is described a case in which the registration module 105 is implemented by the server 10, and therefore there is described a case in which the transmission module 202 transmits the data to the server 10. However, when the registration module 105 is to be implemented by another computer, the transmission module 202 may transmit the data to the another computer. For example, the transmission module 202 transmits the user ID, the password, the face photograph data, and the part of the passcode based on the input operations to each of the input forms F10 to F13. The data transmitted by the transmission module 202 is not limited to those pieces of data, and other various pieces of data may be transmitted.

[3-3. Functions to be implemented by Authentication Device]

As illustrated in FIG. 6, in the authentication device 30, a data storage unit 300, a reception module 301, a transmission module 302, and a processing execution module 303 are implemented. In this embodiment, there is described a case in which the authentication device 30 is included in the authentication system S, but the authentication device 30 may be an external device that can communicate to and from the authentication system S.

[Data Storage Unit]

The data storage unit 300 is mainly implemented by the storage unit 32. The data storage unit 300 is configured to store the data required for authentication. For example, the data storage unit 300 stores information on the IP address of the server 10 and the like. As another example, the data storage unit 300 stores data (e.g., HTML data or image data) for displaying the input form F35 and the like on the display unit 35.

[Reception Module]

The reception module 301 is mainly implemented by the control unit 31. The reception module 301 is configured to receive input operations. The input operations may be input operations required for authentication. In this embodiment, an input operation of the user is not required for face authentication, and hence the reception module 301 receives a passcode input operation. For example, the reception module 301 receives input of the passcode to the input form F35.

It is sufficient for the reception module 301 to receive an input operation corresponding to the type of authentication to be used by the authentication system S. For example, when fingerprint authentication is to be used, an input operation of the user placing a finger on a camera or the like is received. As another example, when handwriting authentication is to be used, an input operation of the user writing characters on a touch panel or the like is received. As another example, when password authentication or countersign authentication is to be used, the reception module 301 receives an operation of inputting a password or a countersign.

[Transmission Module]

The transmission module 302 is mainly implemented by the control unit 31. The transmission module 302 is configured to transmit, based on the input operation, information required for each of the first authentication and the second authentication.

The transmission module 302 may transmit the authentication information itself or may transmit information for identifying the authentication information.

In this embodiment, there is described a case in which the first authentication module 101 and the second authentication module 102 are implemented by the server 10, and therefore there is described a case in which the transmission module 202 transmits the data to the server 10. When the first authentication module 101 and the second authentication module 102 are to be implemented by another computer, the data may be transmitted to the another computer. For example, when the first authentication module 101 and the second authentication module 102 are to be implemented by different computers, the transmission module 202 is only required to transmit the information to those computers.

In this embodiment, the first authentication is face authentication and the second authentication is passcode authentication, and therefore the transmission module 302 transmits an image (face photograph) photographed by the photographing unit 36 and the passcode input to the input form F35. The feature amount of the face may be calculated on the authentication device 30 side, and in this case, the transmission module 302 transmits the calculated feature amount of the face in place of the image.

It is sufficient for the transmission module 302 to transmit information corresponding to the type of authentication to be used by the authentication system S. For example, when fingerprint authentication is to be used, the transmission module 302 may transmit an image of the finger of the user, or a feature amount of the finger calculated from the image may be transmitted. As another example, when handwriting authentication is to be used, the transmission module 302 may transmit an image of characters written on a touch panel or the like by the user, or may transmit coordinate information indicating a change in touch position. As another example, when password authentication or countersign authentication is to be used, the transmission module 302 transmits a password or countersign input by the user.

[Processing Execution Module]

The processing execution module 303 is mainly implemented by the control unit 31. The processing execution module 303 is configured to execute predetermined processing when the first authentication and the second authentication are successful. The processing execution module 303 executes predetermined processing when the first authentication and the second authentication are successful. The meaning of "predetermined processing" is as described above, and the predetermined processing is processing permitted to be executed when authentication is successful.

In this embodiment, when authentication is successful, the security gate SG is unlocked. Therefore, when a notification indicating that authentication is successful is received, the processing execution module 303 unlocks the lock by causing a motor or the like of the lock mechanism to rotate, and when a notification indicating that the authentication is successful is not received, the processing execution module 303 does not unlock the lock. When the first authentication and the second authentication are successful, the processing execution module 106 of the server 10 may transmit a signal for unlocking the lock mechanism in place of a notification indicating that authentication is successful. In this case, the processing execution module 303 of the authentication device 30 is only required to unlock the lock based on the signal.

4. Processing to be Executed in this Embodiment

Next, the processing to be executed by the authentication system S is described. In this case, registration processing for the user to register a face photograph and a passcode and authentication processing for the user to pass through the security gate SG are described.

[4-1. Registration Processing]

Figure 10:
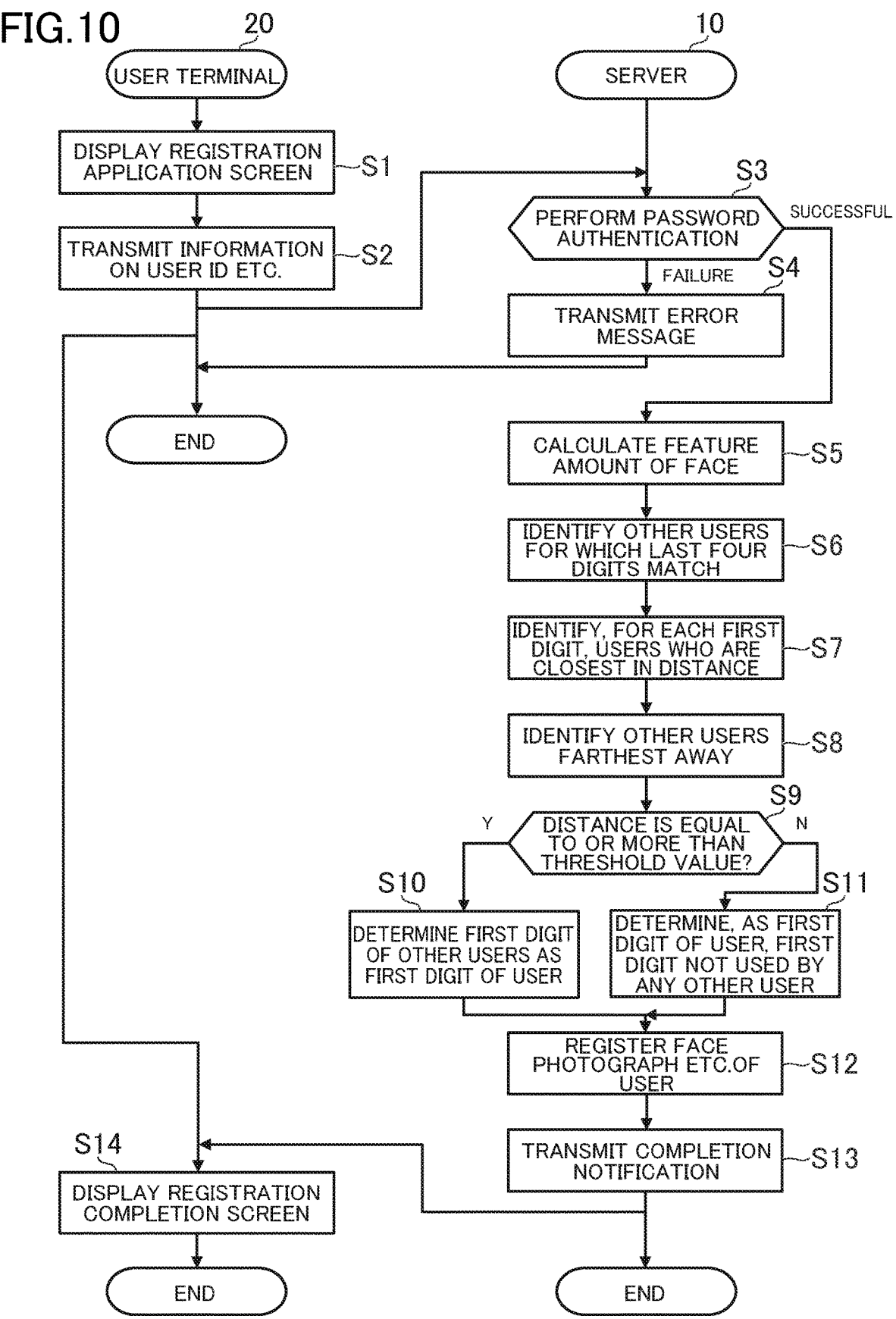
FIG. 10 is a flowchart for illustrating an example of registration processing.

FIG. 10 is a flowchart for illustrating an example of registration processing. The registration processing illustrated in FIG. 10 is executed by the control units 11 and 21 operating in accordance with programs stored in the storage units 12 and 22, respectively. The processing described below is an example of processing to be executed by the functional blocks illustrated in FIG. 6. When executing registration processing, it is assumed that the user has already completed user registration and has been issued with his or her own user ID and password.

As illustrated in FIG. 10, first, when the user terminal 20 accesses the server 10, display data (e.g., HTML data or image data) of the registration application screen G1 is transmitted from the server 10 to the user terminal 20, and the control unit 21 displays the registration application screen G1 on the display unit 25 (Step S1). The registration application screen G1 may be displayed on a web browser or may be displayed on an application stored in the user terminal 20.

The control unit 21 transmits, when the button B14 is selected, the information input to each of the input forms F10 to F13 to the server 10 based on a detection signal of the operation unit 24 (Step S2). In Step S2, the control unit 21 transmits the user ID, the password, the image data of the face photograph, and the last four digits of the passcode input by the user.

In the server 10, when the user ID and the like are received from the user terminal 20, the control unit 11 performs password authentication based on the user database DB and the received user ID and password (Step S3). In Step S3, the control unit 11 determines whether or not in the user database DB, there is a record storing the received combination of the user ID and password. When there is such a record, authentication is successful, and when there is no such record, authentication fails.

When the password authentication fails (Step S3: Failure), the control unit 11 transmits a predetermined error message to the user terminal 20 (Step S4), and the processing ends. In the user terminal 20, when an error message is received, the error message is displayed. In this case, the registration application of the user is not accepted.

Meanwhile, when the password authentication is successful (Step S3: Successful), the control unit 11 calculates, based on the face photograph received in Step S3, the feature amount of the face of the user who has performed the registration application (Step S5). In Step S5, the control unit 11 detects the relative position and the like of the facial part, and calculates the feature amount of the face.

The control unit 11 identifies, based on the user database DB, other users for which the last four digits of the passcode match the those of the user who has performed the registration application (Step S6). In Step S6, the control unit 11 executes a search by using the last four digits of the passcode specified by the user as a query and the last four digits of the passcodes stored in the user database DB as an index.

The control unit 11 identifies, for each first digit of the passcode of the other users identified in Step S6, the other users who are closest in distance to the feature amount of the face of the user who has performed the registration application (Step S7). In Step S7, the control unit 11 groups the other users identified in Step S6 based on the first digit of the passcode, and identifies, for each group, the other users who are closest in distance to the user who has performed the registration application.

The control unit 11 identifies, from among the other users identified in Step S7, the other users farthest from the feature amount of the face of the user who has performed the registration application (Step S8). In Step S8, the control unit 11 identifies, from among the plurality of groups grouped in Step S7, the group having the shortest distance to the user who has performed the registration application.

The control unit 11 determines whether or not the distance between the feature amount of the face of the user who has performed the registration application and the feature amount of the face of the other users identified in Step S8 is equal to or more than a threshold value (Step S9). This threshold value may be the same as the threshold value used in the authentication processing, or a stricter determination may be performed by using a higher threshold value than the threshold value used in the authentication processing.

When it is determined that the distance is equal to or more than the threshold value (Step S9: Y), the control unit 11 determines the first digit of the other users identified in Step S8 as the first digit of the user who has performed the registration application (Step S10). In this case, the user who has performed the registration application does not have a similar face to the other users identified in Step S8, and therefore there is no problem even when the pass coat is the same.

Meanwhile, when it is determined that the distance is less than the threshold value (Step S9: N), the control unit 11 determines, as the first digit of the user who has performed registration application, a first digit not used by any other user for which the last four digits of the passcode match those of the user who has performed the registration application (Step S11). In this case, the user who has performed the registration application has a similar face to the other users identified in Step S8, and therefore a first digit that is not used by anyone else is assigned.

The control unit 11 registers in the user database DB the face photograph, feature amount of the face, and passcode of the user (Step S12). In Step S12, the control unit 11 stores in the user database DB the face photograph received in Step S3, the feature amount of the face calculated in Step S5, and the passcode determined in Step S10 or Step S11 in the record storing the user ID of the user who has performed the registration application.

The control unit 11 transmits a completion notification indicating that the registration is complete to the user terminal 20 (Step S13). The completion notification is performed by transmitting data having a predetermined format, and includes, for example, the registered face photograph and passcode.

In the user terminal 20, when the completion notification is received, the control unit 21 displays the registration completion screen G2 on the display unit 25 (Step S14), and the processing ends. In Step S14, the control unit 21 displays the face photograph and passcode included in the completion notification on the registration completion screen G2.

Thereafter, the user memorizes the passcode so as not to forget the passcode, and inputs the passcode when passing through the security gate SG.

[4-2. Authentication Processing]

Figure 11:
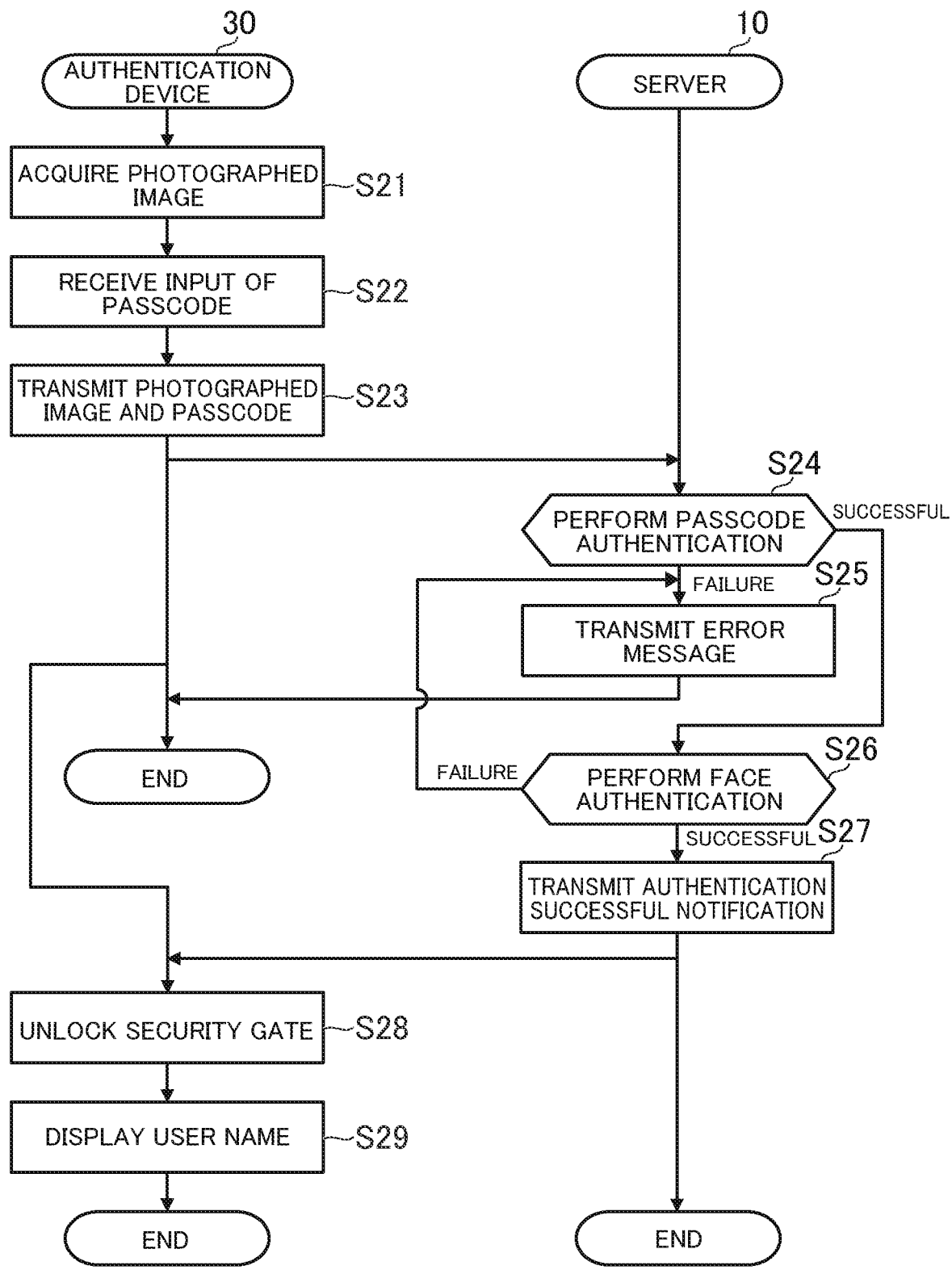
FIG. 11 is a flowchart for illustrating an example of authentication processing.

FIG. 11 is a flowchart for illustrating an example of authentication processing. The authentication processing illustrated in FIG. 11 is executed by the control units 11 and 31 operating in accordance with programs stored in the storage units 12 and 32, respectively. The processing described below is an example of processing to be executed by the functional blocks illustrated in FIG. 6. When authentication processing is to be executed, it is assumed that registration processing is complete.

As illustrated in FIG. 11, first, in the authentication device 30, the control unit 31 acquires a photographed image based on a detection signal of the photographing unit 36 (Step S21). In Step S21, the control unit 31 acquires a photographed image generated by the photographing unit 36, and displays the acquired photographed image in the display area A35 of the display unit 35. The input form F35 and the button B35 are also displayed on the display unit 35, and the display unit 35 can receive input of the passcode by the user.

The control unit 31 receives input of the passcode by the user based on a detection signal of the operation unit 34 (Step S22). In Step S22, the control unit 31 receives input of the five-digit passcode to the input form F35.

The control unit 31 transmits, in response to the user selecting the button B14, the photographed image acquired in Step S21 and the passcode input in Step S22 to the server 10 (Step S23).

In the server 10, when the photographed image and the passcode are received, the control unit 11 performs passcode authentication based on the user database DB (Step S24). In Step S24, the control unit 11 determines whether or not there is a user having a matching passcode. When there is a user having a matching passcode, authentication is successful, and when there is no user having a matching passcode, authentication fails.

In this embodiment, all users who have a matching passcode are identified. Therefore, in Step S24, the control unit 11 execute the search by using the five-digit passcode input by the user as a query and the five-digit passcodes stored in the user database DB as an index. In this search, a complete match between the passcodes is determined. When a complete match is retrieved, authentication is successful, and when a complete match is not retrieved, authentication fails.

When passcode authentication fails (Step S24: Failure), the control unit 11 transmits a predetermined error message to the authentication device 30 (Step S25), and the processing ends. In this case, the error message is displayed on the display unit 35 of the authentication device 30 to notify the user that the passcode is different.

Meanwhile, when passcode authentication is successful (Step S24: Successful), the control unit 11 performs face authentication based on the feature amount of the face of the photographed image received in Step S24 and the feature amount of the face of the user matching the passcode (Step S26). In Step S26, the control unit 11 calculates the similarity degree based on the difference between those feature amounts, and determines whether or not there is a user having a similarity degree equal to or more than a threshold value. When there is a user having a similarity degree equal to or more than the threshold value, authentication is successful, and when there is no user having a similarity degree equal to or more than the threshold value, authentication fails.

When face authentication fails (Step S26: failure), the processing advances to Step S25, an error message is transmitted, and the processing ends. In this case, the error message is displayed on the display unit 35 of the authentication device 30 to notify the user that face authentication has not been successful.

Meanwhile, when face authentication is successful (Step S26: Successful), the control unit 11 transmits to the authentication device 30 an authentication successful notification indicating that passcode authentication and face authentication are both successful (Step S27). The authentication successful notification is performed by transmitting data having a predetermined format, and includes the name of the user for which authentication has been successful.

In the authentication device 30, when the notification is received, the control unit 31 unlocks the security gate SG (Step S28), displays the name of the user for which authentication has been successful on the display unit 35 (Step S29), and the processing ends. The user confirms that his or her name is displayed on the display unit 35, and pushes the door of the security gate to pass through the security gate. In this case, information such as the name of the user and the current date and time may remain in the server 10 as a traffic record.

In the authentication system S, when two-step authentication using face authentication and passcode authentication is executed, for a plurality of users having a similar feature amount of the face to each other, those plurality of users are restricted from registering the same passcode as each other, and therefore impersonation by other users having a similar face can be prevented, and security can be sufficiently enhanced.

Through setting on the authentication system S side the passcode of the user who has performed the registration application such that the passcode is not the same as the passcode of another user having a feature amount of the face similar to that of the user who has performed the registration application, security can be enhanced and the user is not required to specify the passcode over and over again until finding a passcode different from other users having a similar face.

Through causing the user performing the registration application to specify a part of the passcode and setting the remaining part of the passcode such that the passcode is not the same as that of other users having a similar face, a passcode including a part that is easy for the user to remember can be set, and the user can be prevented from forgetting the passcode. For example, when all of a five-digit passcode is generated on the authentication system S side, the user may forget the passcode. However, when the user specifies four of those digits, four of the five digits are information that can be reliably remembered by the user, and therefore it is possible to prevent the user from forgetting the passcode. Also in this case, the remaining numerical value for the one-digit is determined such that the passcode is different from that of other users having a similar face, and it is not possible for those other users to know that numerical value. As a result, security is ensured.

Through identifying other users having a dissimilar face from among the other users having the same part of the passcode as that of the user who has performed the registration application, and setting the remaining part of the passcode of the identified other users as the remaining part of the passcode of the user who has performed the registration application, the available remaining part of the passcode can be prevented from running out. For users having dissimilar faces to each other, authentication is not successful even when the passcode is the same, and therefore security can be ensured.

Through identifying, for each remaining part of the passcode of other users having the same part of the passcode as the user who has performed the registration application, the other users having the most similar face to that of the user who has performed the registration application, and setting the remaining part of the passcode of another user from among the identified other users who has the most dissimilar face to that of the user who has performed the registration application as the remaining part of the passcode of the user who has performed the registration application, the number of other users to be compared with the user can be reduced, and the processing of setting the passcode can be speeded up. In addition, the processing load on the server 10 can be reduced by not performing comparisons that are not required.

Through setting, when there are no other users having a dissimilar feature amount of the face from among the other users having the same part of the passcode as the user who has performed the registration application, as the remaining part of the passcode of the user who has performed the registration application, a remaining part of the passcode that is not being used by any of the other users, it is possible to reliably prevent setting of the same passcode as another user having a similar face, and security can be enhanced.

Through randomly setting the passcode of the user who has performed the registration application such that the passcode is not the same as the passcode of another user having a similar feature amount of the face to the user who has performed the registration application, it is possible to reliably prevent setting of the same passcode as another user having a similar face through relatively simple processing, to thereby be able to speed up the processing of setting the passcode while enhancing security. Through simplifying the processing of setting the passcode, the processing load on the server 10 can also be reduced.

Face authentication is not performed on all the records in the user database DB, but is performed only on records matching the passcode. As a result, face authentication processing can be speeded up. Further, the processing load on the server 10 can also be reduced by not performing comparisons that are not required during face authentication.

Through the use of biometric authentication as the first authentication and passcode authentication as the second authentication, even when the user is not carrying anything such as a card key or the like, secure authentication can be ensured. Further, through adopting two-step authentication using biometric authentication, in which the user is not required to remember the authentication information, and passcode authentication, in which the authentication information is hard for the user to forget, user's convenience can be improved while also improving security. In addition, for example, through the use of face authentication, to which the user has less resistance than to fingerprint authentication, DNA authentication, or other such authentication as biometric authentication, user's convenience can be further improved.

5. Modification Examples

The present invention is not limited to the embodiment described above, and can be modified suitably without departing from the spirit of the present invention.

(1) For example, in the embodiment, a situation in which the user passes through the security gate SG is described as an example, but the authentication system S is also applicable to a situation in which the user purchases a product or uses a service. In this case, for example, the authentication device 30 is a vending machine, a ticket machine, a POS terminal, or a payment terminal in a store. The user faces the photographing unit 36 of the authentication device 30 and inputs the passcode from the operation unit 34. When face authentication and passcode authentication are successful, payment processing is executed, and the product can be purchased or the service can be used.

The registration module 105 in Modification Example (1) of the present invention may register payment information in association with the feature amount of the face and the passcode, and the processing execution module 106 may execute, when face authentication and passcode authentication are successful, payment processing based on the payment information on the user for which face authentication and passcode authentication are successful. The payment information to be referred to at the time of payment processing is payment information associated with the user for which face authentication and passcode authentication is successful.

The payment information is information required in order to perform payment, such as credit card information, electronic value (e.g., electronic money or points) account information, virtual currency account information, bank account information, or debit card information. It is assumed that the payment information is registered during user registration, and is stored in the user database DB in association with the user ID, for example. The payment information may be stored in a database different from the user database DB.

It is sufficient for the processing execution module 106 to execute payment processing corresponding to the payment information. For example, the processing execution module 106 executes credit processing based on credit card information, processing of decreasing an electronic value balance, processing of decreasing a virtual currency balance, processing of debiting and transferring from a bank account, or processing of decreasing the balance of the account indicated by debit card information. The processing execution module 106 does not execute payment processing when any one of face authentication and passcode authentication fails, and executes payment processing when face authentication and passcode authentication are successful.

When payment processing has been executed, that fact is displayed on the display unit 35 of the authentication device 30 or a terminal of the shop, and the user receives the product or uses the service. For example, in a case in which the authentication device 30 is a digital signage device installed in a shop or the like, when an authentication successful notification is received from the server 10, a message indicating that the authentication has been successful is displayed on the display unit 35. When a shop staff member confirms the message, the staff member hands over the product or provides the service to the user. In place of the authentication device 30, the message may be transferred to another computer, such as a terminal operated by the shop staff member, to be displayed. As another example, in a case in which the authentication device 30 is a vending machine, when an authentication successful notification is received from the server 10, the authentication device 30 discharges the product specified by the user or prepares a product such as coffee or instant food.

With the modification example described above, security at the time of purchasing a product or using a service can be sufficiently enhanced by preventing another user having a similar face from improperly purchasing a product or using a service by impersonating the user and paying. Further, from the viewpoint of the user, user's convenience can be improved because it is possible to perform payment in a secure manner even when the user goes to the shop without carrying any money or the like, and from the viewpoint of the shop, shop's convenience can be improved because payment is possible without requiring a dedicated device, for example, a credit card reader, to be installed.

(2) For example, the method of restricting a plurality of users having a similar feature amount of the face to each other from registering the same passcode as each other is not limited to the example described in the embodiment. In Modification Example (2) of the present invention, there is described another example of the restriction method to be performed by the restriction module 104.

(2-1) For example, in place of causing the user to input the last four digits of the password on the registration application screen G1, the restriction module 104 may retrieve other users having a similar feature amount of the face to that indicated by the uploaded face photograph, generate a bus code different from the passcode used by the retrieved other users, and register the generated different passcode as the passcode of the user who has performed the registration application. In this case, all of the five-digit passcode is generated on the server 10 side. In other words, the restriction module 104 may determine not only a part of the passcode as described in the embodiment, but may also determine all of the passcode.

The five-digit passcode generated by the restriction module 104 may be registered in the user database DB without particularly obtaining user's approval, or may be registered in the database DB only after the user has been notified of the passcode and user's approval is obtained. When the user does not give his or her approval, the restriction module 104 may generate a different passcode and repeat passcode generation until the user gives his or her approval.

(2-2) For example, the restriction module 104 may generate a plurality of passcodes that are not used by the other users having a similar feature amount of the face, and cause the user who has performed the registration application to select the passcode to be used from among those plurality of passcodes. In this case, the plurality of passcodes generated by the restriction module 104 are notified to the user who has performed the registration application, and the user selects one of the plurality of passcodes. The registration module 105 registers the passcode selected by the user from among the plurality of passcodes generated by the restriction module 104.

(2-3) For example, when the last four digits of the passcode specified by the user who has performed the registration application are being used by another user having a similar feature amount of the face, the restriction module 104 may propose using a different last four digits. In this case, as in Modification Example (2-1) or (2-2), the restriction module 104 may propose a passcode that is not used by other users having a similar feature amount of the face. As another example, the user who has performed the registration application may specify all the digits of the passcode, and the restriction module 104 may repeatedly prompt the user to specify a passcode until the user specifies a passcode that is not being used by another user having a similar face.

(3) Further, for example, the above-mentioned modification examples may be combined.

For example, there has been described a case in which biometric authentication is executed based on an image photographed by the photographing unit 36 of the authentication device 30. However, the biometric authentication may also be executed by using another sensor, such as an infrared sensor or an ultrasonic sensor. The authentication system S is only required to include a sensor corresponding to the biometric authentication to be used as the first authentication.

For example, there has been described a case in which the authentication information is input to the authentication device 30, but the authentication information may be input to the user terminal 20 or another computer. In the case in which the authentication information is input to the user terminal 20, the first digit of the passcode determined on the server 10 side may be stored in the storage unit 22 of the user terminal 20, and the user may input the last four digits of the passcode at the time of authentication. In this case, a passcode including a first digit stored in the storage unit 22 of the user terminal 20 and the last four digits input by the user from the operation unit 24 may be transmitted to the server 10, and passcode authentication may be executed. In this way, the user is only required to remember the four digits that he or she has specified, and hence user's convenience can be improved. Further, for example, the content to be input may be differentiated in accordance with the situation, such as when the user performs payment at the user terminal 20, the user only inputs four digits as described above, and when the user performs payment with the authentication device 30 without carrying any money or the like, inputs all five digits.

For example, there has been described a case in which biometric authentication is the first authentication, but the first authentication may be any authentication based on similarity, and is not limited to biometric authentication. For example, pattern authentication in which the user draws a predetermined locus on a touch panel may be used as the first authentication. As another example, the first authentication may be authentication based on similarity between countersigns. In this case, when the countersign input by the user is similar to the countersign registered in the user database DB (proportion of matching part is equal to or more than threshold value), authentication is successful, and when those countersigns are not similar, authentication fails. As another example, as the first authentication, a plurality of biometric authentications may be used in combination, or pattern authentication and countersign authentication may be used in combination.

For example, there has been described a case in which passcode authentication is the second authentication, but a plurality of authentications may be combined for the second authentication. For example, the second authentication may be a combination of countersign authentication and passcode authentication. In this case, the second authentication information is a combination of a countersign and a passcode. For example, the passcode specified by the user may be used as it is in the passcode authentication, and the restriction module 104 may set, as the countersign of the user who has performed the registration application, a countersign that is not the same as that of other users who have a similar face and who use the same passcode. As another example, when image selection authentication, in which a correct image is selected from among a plurality of images, is used as a part of the second authentication in place of a countersign, the restriction module 104 may set, as the correct image of the user who has performed the registration application, an image that is not the same as that of other users who have a similar face and who use the same passcode. Further, for example, other authentication methods may be used for the second authentication, such as password authentication, private key authentication, or electronic certificate authentication.

For example, there has been described a case in which the main functions are implemented by the server 10, but each function may be shared by a plurality of computers. For example, functions may be shared among the server 10, the user terminal 20, and the authentication device 30. For example, the authentication processing may be executed by the user terminal 20 or the authentication device 30 in place of the server 10. Further, for example, when the authentication system S includes a plurality of server computers, the functions may be shared by those plurality of server computers. In addition, for example, the data described as being stored in the data storage unit 100 may be stored by a computer other than the server 10.

The invention claimed is:

1. An authentication system, comprising a memory comprising instructions and at least one processor configured to execute the instructions to:
    register, for each user, first authentication information and second authentication information in a storage;
    perform first authentication based on a similarity between the first authentication information that has been input and the registered first authentication information;
    perform second authentication based on a match between the second authentication information that has been input and the registered second authentication information; and
    restrict a plurality of users having similar first authentication information to each other from registering the same second authentication information as each other,
    acquire the first authentication information on a user who has performed a predetermined registration application,
    set the second authentication information on the user who has performed the predetermined registration application such that the set second authentication information is prevented from being the same as the second authentication information on another user having similar first authentication information to the user who has performed the predetermined registration application, and
    register the second authentication information as the second authentication information on the user who has performed the predetermined registration application;
    further acquire a part of the second authentication information specified by the user who has performed the predetermined registration application, and
    set a remaining part of the second authentication information on the user who has performed the predetermined registration application such that the set second authentication information is prevented from being the same as the second authentication information on the another user;
    identify, from among other users having the same part as the part of the user who has performed the predetermined registration application, another user having dissimilar first authentication information; and
    set the remaining part of the identified another user as the remaining part of the user who has performed the predetermined registration application.

2. The authentication system according to claim 1, wherein the at least one processor is configured to:
    identify, for each remaining part of the other users having the same part as the part of the user who has performed the predetermined registration application, other users having the most similar first authentication information to the first authentication information on the user who has performed the predetermined registration application; and
    set, as the remaining part of the user who has performed the predetermined registration application, the remaining part of another user from among the identified other users who has the most dissimilar first authentication information to the first authentication information on the user who has performed the predetermined registration application.

3. The authentication system according to claim 1, wherein, when there are no other users having dissimilar first authentication information among the other users having the same part as the part of the user who has performed the predetermined registration application, the at least one processor sets a remaining part that is yet to be used, as the remaining part of the user who has performed the predetermined registration application.

4. The authentication system according to claim 1, wherein the at least one processor is configured to randomly set the second authentication information on the user who has performed the predetermined registration application such that the set second authentication information is prevented from being the same as the second authentication information on another user having similar first authentication information to the first authentication information on the user who has performed the predetermined registration application.

5. The authentication system according to claim 1, wherein the at least one processor is configured to:
    extract the first authentication information on a user matching the second authentication information that has been input, from among pieces of first authentication information registered in the storage; and
    perform the first authentication based on the first authentication information that has been input and the extracted first authentication information.

6. The authentication system according to claim 1, wherein the first authentication information includes biometric authentication information,
    wherein the first authentication includes biometric authentication,
    wherein the second authentication information includes a passcode having a predetermined number of digits,
    wherein the second authentication includes passcode authentication, and
    wherein the at least one processor is configured to restrict a plurality of users having similar biometric authentication information to each other from registering the same passcode as each other.

7. The authentication system according to claim 1, wherein the at least one processor is configured to:
    further register payment information in association with the first authentication information and the second authentication information, and
    execute, when the first authentication and the second authentication are successful, payment processing based on the payment information on a user for which the first authentication and the second authentication are successful.

8. The authentication system of claim 1, further comprising:
    an authentication device, comprising at least one processor configured to:

receive an input operation;
transmit, based on the input operation, information required for each of the first authentication and the second authentication; and
execute predetermined processing when the first authentication and the second authentication are successful.

9. An authentication method, comprising:
registering, for each user, first authentication information and second authentication information in a storage;
performing first authentication based on a similarity between the first authentication information that has been input and the registered first authentication information;
performing second authentication based on a match between the second authentication information that has been input and the registered second authentication information; and
restricting a plurality of users having similar first authentication information to each other from registering the same second authentication information as each other,
acquiring the first authentication information on a user who has performed a predetermined registration application,
setting the second authentication information on the user who has performed the predetermined registration application such that the set second authentication information is prevented from being the same as the second authentication information on another user having similar first authentication information to the user who has performed the predetermined registration application, and
registering the second authentication information as the second authentication information on the user who has performed the predetermined registration application;
further acquiring a part of the second authentication information specified by the user who has performed the predetermined registration application, and
setting a remaining part of the second authentication information on the user who has performed the predetermined registration application such that the set second authentication information is prevented from being the same as the second authentication information on the another user;
identifying, from among other users having the same part as the part of the user who has performed the predetermined registration application, another user having dissimilar first authentication information; and
setting the remaining part of the identified another user as the remaining part of the user who has performed the predetermined registration application.

10. A non-transitory computer-readable information storage medium having stored thereon a program for causing a computer to:
register, for each user, first authentication information and second authentication information in a storage;
perform first authentication based on a similarity between the first authentication information that has been input and the registered first authentication information;
perform second authentication based on a match between the second authentication information that has been input and the registered second authentication information; and
restrict a plurality of users having similar first authentication information to each other from registering the same second authentication information as each other;
acquire the first authentication information on a user who has performed a predetermined registration application,
set the second authentication information on the user who has performed the predetermined registration application such that the set second authentication information is prevented from being the same as the second authentication information on another user having similar first authentication information to the user who has performed the predetermined registration application, and
register the second authentication information as the second authentication information on the user who has performed the predetermined registration application;
further acquire a part of the second authentication information specified by the user who has performed the predetermined registration application, and
set a remaining part of the second authentication information on the user who has performed the predetermined registration application such that the set second authentication information is prevented from being the same as the second authentication information on the another user;
identify, from among other users having the same part as the part of the user who has performed the predetermined registration application, another user having dissimilar first authentication information; and
set the remaining part of the identified another user as the remaining part of the user who has performed the predetermined registration application.

* * * * *